(12) United States Patent
Hankawa et al.

(10) Patent No.: US 7,623,306 B2
(45) Date of Patent: Nov. 24, 2009

(54) ZOOM LENS AND IMAGING APPARATUS INCORPORATING THE SAME

(75) Inventors: Masashi Hankawa, Hachioji (JP); Tomoyuki Satori, Kawagoe (JP)

(73) Assignee: Olympus Imaging Corp., Tokyo (JP)

(*) Notice: Subject to any disclaimer, the term of this patent is extended or adjusted under 35 U.S.C. 154(b) by 0 days.

(21) Appl. No.: 12/319,050

(22) Filed: Dec. 30, 2008

(65) Prior Publication Data
US 2009/0174951 A1   Jul. 9, 2009

(30) Foreign Application Priority Data
Jan. 9, 2008   (JP) .............................. 2008-002099

(51) Int. Cl.
*G02B 9/34*   (2006.01)
(52) U.S. Cl. ................. 359/781; 359/432; 359/676; 359/677; 359/740
(58) Field of Classification Search ................. 359/432, 359/676, 677, 740, 781
See application file for complete search history.

(56) References Cited

U.S. PATENT DOCUMENTS 6,633,437 B1 * 10/2003 Hoshi et al. ................. 359/687
2005/0190457 A1    9/2005 Ohashi
2006/0098301 A1    5/2006 Miyajima

FOREIGN PATENT DOCUMENTS

| JP | 2005-242116 | 9/2005 |
|---|---|---|
| JP | 2005-326743 | 11/2005 |
| JP | 2006-78979 | 3/2006 |
| JP | 2006-171055 | 6/2006 |

* cited by examiner

*Primary Examiner*—Joseph Martinez
(74) *Attorney, Agent, or Firm*—Kenyon & Kenyon LLP

(57) ABSTRACT

A zoom lens comprises, in order from its object side, a front lens group having negative refracting power at a wide-angle end and a rear lens group having positive refracting power at the wide-angle end. The front lens group comprises, in order from the object side, a first lens group of positive refracting power and a second lens group of negative refracting power, and the rear lens group comprises, in order from the object side, a third lens group of positive refracting power and a fourth lens group of positive refracting power. There is an aperture stop interposed between the lens surface located in, and nearest to the object side of, the second lens group and the lens surface located in, and nearest to the image size of, the third lens group. Upon zooming from the wide-angle end to the telephoto end, the spacing between the first lens group and the second lens group grows wide, the spacing between the second lens group and the third lens group becomes narrow, the spacing between the third lens group and the fourth lens group changes, and an F-number grows greatest when the aperture stop is open in the course of zooming from the wide-angle end to the telephoto end.

19 Claims, 13 Drawing Sheets

Example 1

Example 2

Example 3

Example 1

(a)

(b)

(c)

Example 1

Example 2

(a)

(b)

(c)

Example 2

Example 3

Example 3

ZOOM LENS AND IMAGING APPARATUS INCORPORATING THE SAME

This application claims benefit of Japanese Application No. 2008-002099 filed in Japan on Jan. 9, 2008, the content of which are incorporated by this reference.

BACKGROUND OF THE INVENTION

The present invention relates generally to a zoom lens and imaging apparatus incorporating the same, and more specifically to a zoom lens having high zoom capability and compatible with electronic imaging devices such as CCDs or C-MOSs.

In recent years, imaging apparatus such as digital cameras designed to take images of subjects using solid-state imaging devices such as CCDs or CMOSs have gone mainstream in place of silver-halide film cameras. Further, they have now a wide spectrum of categories from the commercial high-end type to the compact low-end type.

Users of such low-end type digital cameras would enjoy snapping shots over a wide range of scenes at any time in any place. For this reason, preference is given to small-format digital cameras.

On the other hand, digital cameras of the compact type have generally had a zoom ratio of about 3. Still, to take scenes wider than before, there is a zoom lens demanded that has higher zoom ratios on the wide-angle side and/or the telephoto side.

Among zoom lenses known to achieve high zoom ratios easily, there is a zoom lens comprising three or more lens groups, typically, a first lens group of positive refracting power, a second lens group of negative refracting power and a third lens group of positive refracting power in order from its object side. For instance, some zoom lenses having a zoom ratio of about 4.5 are known from the following patent publications 1, 2 and 3, and a zoom lens having a much higher zoom ratio of about 10 is known from the following patent publication 4.

[Patent Publication 1]
JP(A) 2005-242116
[Patent Publication 2]
JP(A) 2005-326743
[Patent Publication 3]
JP(A) 2006-378979
[Patent Publication 4]
JP(A) 2006-171055

However, the zoom lenses of patent publications 1, 2 and 3 have a large angle of view at the telephoto end, running short of performance for high magnification needs. With the zoom lens of Patent Publication 4, the whole optical system has a long full length, although having a high enough zoom ratio.

Referring generally to a zoom lens comprising lens groups of positive, negative and positive refracting powers in order from the object side, imparting high zoom capability to it causes its full length at the telephoto end to be likely to grow long. To make the zoom lens thin upon received in a collapsible lens mount, the respective lens groups must be slimmed down and, at the same time, the full length at the telephoto end must be cut down to keep low the height of a lens barrel for driving them.

On the other hand, as the full length at the telephoto end becomes short, it makes the refracting power of each lens group likely to grow strong, resulting in the likelihood of various aberrations in general, and aberrations in particular that result from ray beams around the screen and, hence, difficulty in satisfactory correction of peripheral performance all over the zooming range.

Having been made in view of such problems with the prior art, the present invention has for its object the provision of a zoom lens that, albeit having high zoom capability, facilitates holding back aberrations around a screen that are apt to occur somewhere in the zooming range, and so favors size reductions or high zoom ratio capability, and an imaging apparatus incorporating the same.

SUMMARY OF THE INVENTION

According to the invention, the aforesaid object is accomplishable by the provision of a zoom lens comprising, in order from its object side, a front lens group having negative refracting power at a wide-angle end and a rear lens group having positive refracting power at the wide-angle end, wherein said front lens group comprises, in order from the object side, a first lens group of positive refracting power and a second lens group of negative refracting power and said rear lens group comprises, in order from the object side, a third lens group of positive refracting power and a fourth lens group of positive refracting power; an aperture stop is included between the lens surface in, and nearest to an image side of, said second lens group and the lens surface in, and nearest to the image side of, said third lens group; upon zooming from the wide-angle end to a telephoto end, the spacing between the first lens group and the second lens group grows wide, the spacing between the second lens group and the third lens group becomes narrow, and the spacing between the third lens group and the fourth lens group changes, and an F-number grows greatest when the aperture stop is open in the course of zooming from the wide-angle end to the telephoto end.

At the wide-angle end, the front lens group and the rear lens group takes on a retrofocus type lens arrangement favoring a wide-angle arrangement.

By changing the spacing between the first lens group and the second lens group, and between the second lens group and the third lens group as described above, the second lens group, and the third lens group is allowed to have zooming capability, contributing favorably to high zoom ratio capability. The change in the spacing between the fourth lens group and the third lens group, each having positive refracting power, works for field curvature reductions upon zooming and making sure higher zoom ratio capability.

Preferably, the aperture stop should be located at the aforesaid position.

Good enough correction of aberrations generally proportional to an odd-numbered order, i.e., distortion, chromatic aberration of magnification and coma may be implemented by a symmetrical refracting power profile with the aperture stop at its center; however, if the aperture stop is positioned between the image side of the second lens group and the image side of the third lens group, it is then possible to balance the amount of aberrations proportional to the odd-numbered order well against the amount of astigmatism and field curvature.

When it comes to such a lens type, the aperture stop must be positioned closer to an image plane so as to have the greatest F-number at the telephoto end as in the prior art. For this reason, during zooming, the height of off-axis rays through the fourth lens group becomes low with respect to the height of off-axis rays through the first lens group, throwing symmetry about the aperture stop largely off balance; on the way from the wide-angle end to the telephoto end, coma, distortion and chromatic aberration of magnification occur too much for correction. In other words, during zooming, the rays through the first lens group gains height, making the aforesaid aberrations likely to occur, whereas the height of the rays through the rear group inclusive of the fourth lens group become low, resulting in under-correction of the aforesaid aberrations produced at the first lens group.

In the invention, therefore, the aperture stop and lenses are positioned such that the F-number grows greatest in the course of zooming where the heights of the rays through the first and fourth lens group are likely to be thrown off balance, thereby making it easy to reduce the size of the first lens group as well as aberrational fluctuations in the course of zooming.

In the course of zooming from the wide-angle end to the telephoto end, increasing the F-number facilitates reducing a flare component due to higher-order aberrations of off-axis coma likely to occur in the course of zooming, working for high performance.

Further, it is desired that the spacing between the first lens group and the image plane change in such a way as to grow wider at the telephoto end than at the wide-angle end, with the satisfaction of the following conditions (1) and (2):

$$0.01 < [Fno(t)/Fno(w)]/(ft/fw) < 0.30 \quad (1)$$

$$1.013 < Fno(m)/Fno(t) < 1.2 \quad (2)$$

where Fno(w) is an F-number at the wide-angle end,

Fno(t) is an F-number at the telephoto end,

Fno(m) is an F-number at a position where the F-number grows greatest, fw is the focal length of the whole zoom lens system at the wide-angle end, and ft is the focal length of the whole zoom lens system at the telephoto end.

Letting the first lens group and the image plane have such relations as mentioned above allows for reductions in the total length of the zoom lens at the wide-angle end, favoring size and diameter reductions. This also works for making sure the zoom ratio due to the second lens group.

As noted above, it is preferable to satisfy conditions (1) and (2).

Condition (1) stands for the division of the F-number ratio at the telephoto and wide-angle ends by a zoom magnification: the ratio of axial light beams on a principal plane at the telephoto and wide-angle ends. Abiding by the lower limit of 0.01 to condition (1) works for prevention of the diameter of the axial light beam from growing large on the principal plane at the telephoto end and, hence, making sure good enough optical performance. Abiding by the upper limit of 0.30 to condition (1) works for making sure the desired zoom ratio.

Condition (2) stands for the ratio between the F-number at the zooming position where that F-number grows greatest and the F-number at the telephoto end. Abiding by the lower limit of 1.013 to condition (2) works for reducing aberrational fluctuations in the course of zooming. Abiding by the upper limit of 1.2 to condition (2) serves to make small the differences in the full length of the zoom lens between at the zooming status where the F-number grows greatest and at the telephoto end, favoring size reductions of the zoom lens at the telephoto end.

More preferably, the lower and upper limits to the range of condition (1) should be set at 0.05, especially 0.10 and 0.25, especially 0.20, respectively.

More preferably, the lower and upper limits to the range of condition (2) should be set at 1.015, especially 1.02, more especially 1.03 and 1.15, especially 1.10, respectively.

It is desired that the first lens group comprise one negative lens and one positive lens.

The invention facilitates keeping low the height of incidence of rays on the first lens group, favoring correction of off-axis aberrations. In other words, the aforesaid lens arrangement is made up of as few lenses as possible so as to cancel out chromatic aberrations likely to occur at the first lens group, thereby offering a sensible tradeoff between size reductions and high performance.

It is desired that the aforesaid aperture stop be of constant size all over the zooming range when it is open.

This allows the aperture stop to be always of substantially round shape, favoring reductions of flares, etc.

It is desired to satisfy the following condition (3):

$$0.5 < Lt/ft < 1.4 \quad (3)$$

where Lt is the real distance on the optical axis of the surface located in, and nearest to the object side of, the first lens group to the image plane at the telephoto end, and ft is the focal length of the whole zoom lens system at the telephoto end.

Condition (3) stands for the preferable ratio between the full length and the focal length of the zoom lens at the telephoto end. Abiding by the lower limit of 0.5 to condition (3) allows the focal length at the telephoto end to be set properly, favoring maintenance of optical performance. Abiding by the upper limit of 1.4 to condition (3) allows the full length to be set properly with respect to the focal length, favoring size reductions. As the upper limit of 1.4 is exceeded, it renders it impossible to achieve size reductions one of the objects of the invention.

More preferably, the lower and upper limits to the range of condition (3) should be set at 0.7, especially 0.8 and 1.3, especially 1.25, respectively.

It is desired that the zoom lens be a four-group one.

In the invention, lens group arrangements of +−+−+, +−++− or other refracting power profiles in order from the object side may be contemplated; however, a four-group zoom lens of +−++ refracting power profile is of the most simplified construction, favoring size and cost reductions when the lenses are put away in a collapsible lens mount.

For the fourth lens group, it is desired to satisfy the following condition (4):

$$0.5 < f1/f4 < 3.5 \quad (4)$$

where f1 is the focal length of the first lens group, and f4 is the focal length of the fourth lens group.

Condition (4) specifies the preferable ratio between the refracting powers of the first and fourth lens groups. Abiding by the lower limit of 0.5 to condition (4) prevents the refracting power of the first lens group from growing too strong for the refracting power of the fourth lens group, so that coma, distortion and chromatic aberration of magnification occurring at the first lens group can easily be corrected. Abiding by the upper limit of 3.5 to condition (4) prevents the refracting power of the fourth lens group from growing too strong for the refracting power of the first lens group, so that over-correction of coma, distortion and chromatic aberration can easily be held back. That is, setting the focal length ratio between the upper limit and the lower limit allows the refracting power profile of the lens system about the aperture stop to be well balanced, facilitating correction of aberrations.

More preferably, the lower and upper limits to the range of condition (4) should be set at 1.0, especially 1.5, more especially 1.9 and 3.0, especially 2.5, respectively.

The intermediate zooming state here is defined as a state where the second lens group moves such that the spacing between it and the image plane grows widest in the course of zooming from the wide-angle end to the telephoto end, the third lens group moves such that the spacing between it and the image plane grows widest in the course of zooming from the wide-angle end to the telephoto end and grows wider at the telephoto end than at the wide-angle end, the aperture stop moves such that the spacing between it and the image plane grows widest in the course of zooming from the wide-angle end to the telephoto end and grows wider at the telephoto end than at the wide-angle end, and the spacing between the third lens group and the image plane grows widest. Preferably in this state, the first lens group is positioned more on the object side in the intermediate zooming state than at the wide-angle end, and the aperture stop is positioned more on the object side in the intermediate zooming state at the wide-angle end.

The arrangement being such, each lens group is allowed to have its own zooming function: the zooming function of any one of the lens groups is prevented from growing too strong, working for reducing the amount of movement of the lens groups during zooming. By moving the aperture stop in a convex locus toward the object side as is the case with the third lens group, the exit pupil is so spaced away from the image plane that the zooming range is easily ensured while good enough telecentric capability is maintained during zooming.

Because the aperture stop is positioned near the third lens group, the locus of movement of the aperture stop is in approximation to or in alignment with the locus of movement of the third lens group, working for reducing the size of the third lens group, too.

And in the intermediate zooming state wherein the third lens group is positioned nearest to the object side, as the first lens group is positioned more on the object side than at the wide-angle end, it allows the second lens group and the third lens group to share zooming, favoring aberrational reductions, too.

This also brings the aperture stop close to the second lens group so that the heights of incidence of rays on the first and second lens groups can be kept low, favoring diameter reductions and correction of various off-axis aberrations.

And, near the telephoto end, the second lens group is allowed to move for zooming for the purpose of preventing the total length of the zoom lens from growing too long while making sure the zooming function due to the spacing change between the first lens group and the second lens group. At this time, as the aperture stop and the third lens group move toward the image side near the telephoto end, it makes sure the space for the second lens group to move toward the image side, favoring high zoom ratio capability while preventing the total length from growing long.

Further, it is desirous to satisfy the following condition (5):

$$1.2 < f3/|f2| < 2.5 \tag{5}$$

where f3 is the focal length of the third lens group, and f2 is the focal length of the second lens group.

To let the second lens group have its own zooming function satisfactorily, it is preferable that the refracting power of the second lens group is stronger than that of the third lens group.

Condition (5) specifies the more preferable distribution of refracting power between the second lens group and the third lens group. Abiding by the lower limit of 1.2 to condition (5) makes sure the refracting power of the second lens group, working for making sure the desired zoom ratio near the telephoto end due to the movement of the second lens group toward the image side or, alternatively, holds back the refracting power of the third second lens group, working for reducing spherical aberrations, etc. at the third lens group. Abiding by the upper limit of 2.5 to condition (5) makes sure the refracting power of the third lens group, and prevents the zooming function of the second lens group from growing excessive, working for reducing fluctuations of aberrations occurring at the second lens group.

More preferably, the lower and upper limits to the range of condition (5) should be set at 1.3, especially 1.4 and 2.0, especially 1.8, respectively.

For the first lens group, it is preferable to move with the satisfaction of the following condition (6):

$$0.55 < (T1m-T1w)/(T1t-T1w) < 1.3 \tag{6}$$

where T1w is the real distance on the optical axis from the lens surface located in, and nearest to the object side of, the first lens group to the image plane, as measured at the wide-angle end, T1m is the real distance on the optical axis from the lens surface located in, and nearest to the object side, of the first lens group to the image plane, as measured in the intermediate zooming state, and T1t is the real distance on the optical axis from the lens surface located in, and nearest to the object side of, the first lens group to the image plane, as measured at the telephoto end.

Condition (6) specifies the preferable relations of the amount of movement of the first lens group from the wide-angle end to the intermediate zooming state vs. the amount of movement of the first lens group from the wide-angle end to the telephoto end. Abiding by the lower limit of 0.55 to condition (6) prevents the first lens group from drawing nearer to the object side in the vicinity of the intermediate zooming state, working for reducing the amount of movement of the third lens group. Abiding by the upper limit of 1.3 to condition (6) prevents the first lens group from drawing nearer to the image side at the telephoto end, working for making sure the desired zoom ratio and cutting back the maximum whole length of the zoom lens during zooming.

For the second lens group, it is preferable to move such that the spacing between it and the image plane grows narrower at the telephoto end than at the wide-angle end.

This works for allowing the second lens group to have its own zooming function, facilitates keeping small the amount of movement of the first, and the third lens group, and favors slimming down the zoom lens upon received in a collapsible lens mount as well.

For the second lens group, it is desired to move first toward the object side upon zooming from the wide-angle end to the telephoto end.

This allows for a decrease in the total length of the zoom lens at the telephoto end, working for making the effective diameter of the second lens group small.

For the third lens group, it is desired to move with the satisfaction of the following condition (7):

$$1.0 < (T3m-T3w)/(T3t-T3w) < 1.5 \tag{7}$$

where T3w is the real distance on the optical axis from the lens surface located in, and nearest to the object side of, the third lens group to the image plane, as measured at the wide-angle end, T3m is the real distance on the optical axis from the lens surface located in, and nearest to the object side, of the third lens group to the image plane, as measured in the intermediate zooming state, and T3t is the real distance on the optical axis from the lens surface located in, and nearest to the object side of, the third lens group to the image plane, as measured at the telephoto end.

Condition (7) specifies the preferable relations of the amount of movement of the third lens group from the wide-angle end to the intermediate zooming state vs. the amount of movement of the third lens group from the wide-angle end to the telephoto end. Abiding by the lower limit of 1.0 to condition (7) works for making sure the second lens group has the zooming function at the telephoto end. Abiding by the upper limit of 1.5 to condition (7) prevents the third lens group from drawing nearer to the image side at the telephoto end, lessens the load of the second lens group on zooming, and makes it easy to hold back aberrational fluctuations.

It is desired to satisfy the following condition (8):

$$0.3 < fm/ft < 0.9 \quad (8)$$

where fm is the focal length of the whole zoom lens system in the intermediate zooming state, and ft is the focal length of the whole zoom lens system at the telephoto end.

Condition (8) specifies the preferable zooming status when the third lens group is positioned nearest to the object side. Abiding by the lower limit of 0.3 to condition (8) prevents the load of the second lens group on zooming from growing too large all over the zooming range from the wide-angle end to the telephoto end, working for holding back aberrational fluctuations. Abiding by the upper limit of 0.9 to condition (8) prevents the load of the third lens group on zooming from growing too large all over the zooming range, working for holding back aberrational fluctuations.

It is desired that the fourth lens group be positioned more on the image side at the telephoto end than at the wide-angle end.

This enables the fourth lens group, too, to share zooming, favoring correction of aberrational fluctuations and higher zoom ratio capability.

For the second lens group, it is desired to comprise a double-concave negative lens located in, and nearest to the image side of, the second lens group and a positive lens located on the image side with respect to the aforesaid double-concave negative lens.

The second lens group being of such arrangement, the entrance pupil position can be brought closer to the object side so that peripheral performance can well be corrected while the outer diameter of the first, and the second lens group is kept small.

It is desired that the third lens group comprise, in order from the object side, a single lens of positive refracting power and a cemented doublet lens of negative refracting power, wherein said cemented doublet lens is made up of, in order from the object side, a positive lens and a negative lens.

The third lens group of such arrangement works for reducing the lens diameter of the third lens group, and favors correction of spherical aberrations and coma. It also allows the principal points of the third lens group to draw nearer to an object, favoring higher zoom ratio capability.

Preferably, there is an imaging apparatus provided that comprises the aforesaid zoom lens and an imaging device located on an image side thereof and adapted to convert an image formed through that zoom lens into electric signals.

It is thus possible to provide an imaging apparatus comprising the zoom lens that, albeit being of small-format size, has a high zoom ratio.

Preferably, the imaging apparatus further comprises an image processing block adapted to implement signal processing to correct the aforesaid electric signals for aberrations contained in them.

Allowance of aberrations from the zoom lens works more for size reductions, etc.

It is here noted that when the zoom lens has a focusing function, the lens groups are going to move and satisfy the aforesaid conditions while the zoom lens is in focus on the farthest away object.

Focusing from a far away object to a nearby object may be implemented by letting out the first lens group or the whole zoom lens, or by the movement of the second lens group and the third lens group. For lessening driving loads, focusing is preferably implemented with the fourth lens group of positive refracting power.

As can be appreciated from the foregoing, the present invention can provide a zoom lens that can easily hold back aberrations around the screen, which are likely to occur in the course of zooming, and favor size reductions or high zoom ratio capability as well as an imaging apparatus incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

In the following examples that underlie the invention, there is a zoom lens provided, which, through such contrivances as described above, is allowed to have a high zoom ration, a small-format size in the diametrical direction, and good enough optical performance.

The following examples are each directed to an imaging apparatus incorporating a zoom lens of the type wherein lenses are let out at the startup. More exactly, Examples 1 to 3 each provide a zoom lens having higher optical performance and improved in terms of compactness. Throughout Examples 1 to 3, the effective imaging area is of constant rectangular shape in all zooming statues. In the respective examples, the values for the specific conditions have been found at the time of focusing on an object point at infinity. Total Length is the axial distance from the entrance surface to the exit surface of the zoom lens plus a back focus as calculated on an air basis.

Figure 1:
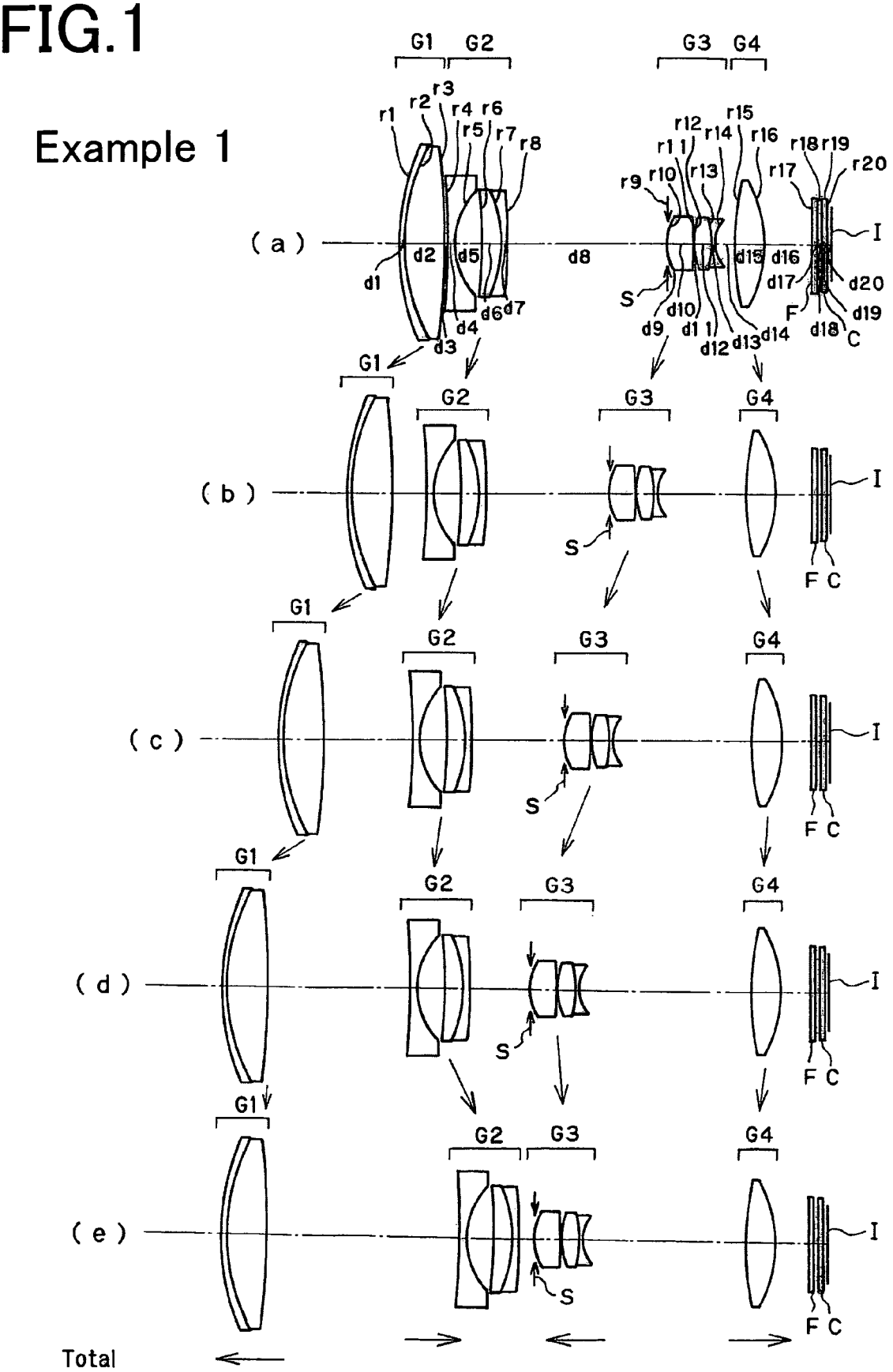
FIG. 1 is illustrative in lens arrangement section of Example 1 of the inventive zoom lens at a wide-angle end (a), in a wide-angle side state (b), in an intermediate focal length state (c), in an intermediate zooming state (d) and at a telephoto end (e) upon focusing on an object point at infinity.
Figure 2:
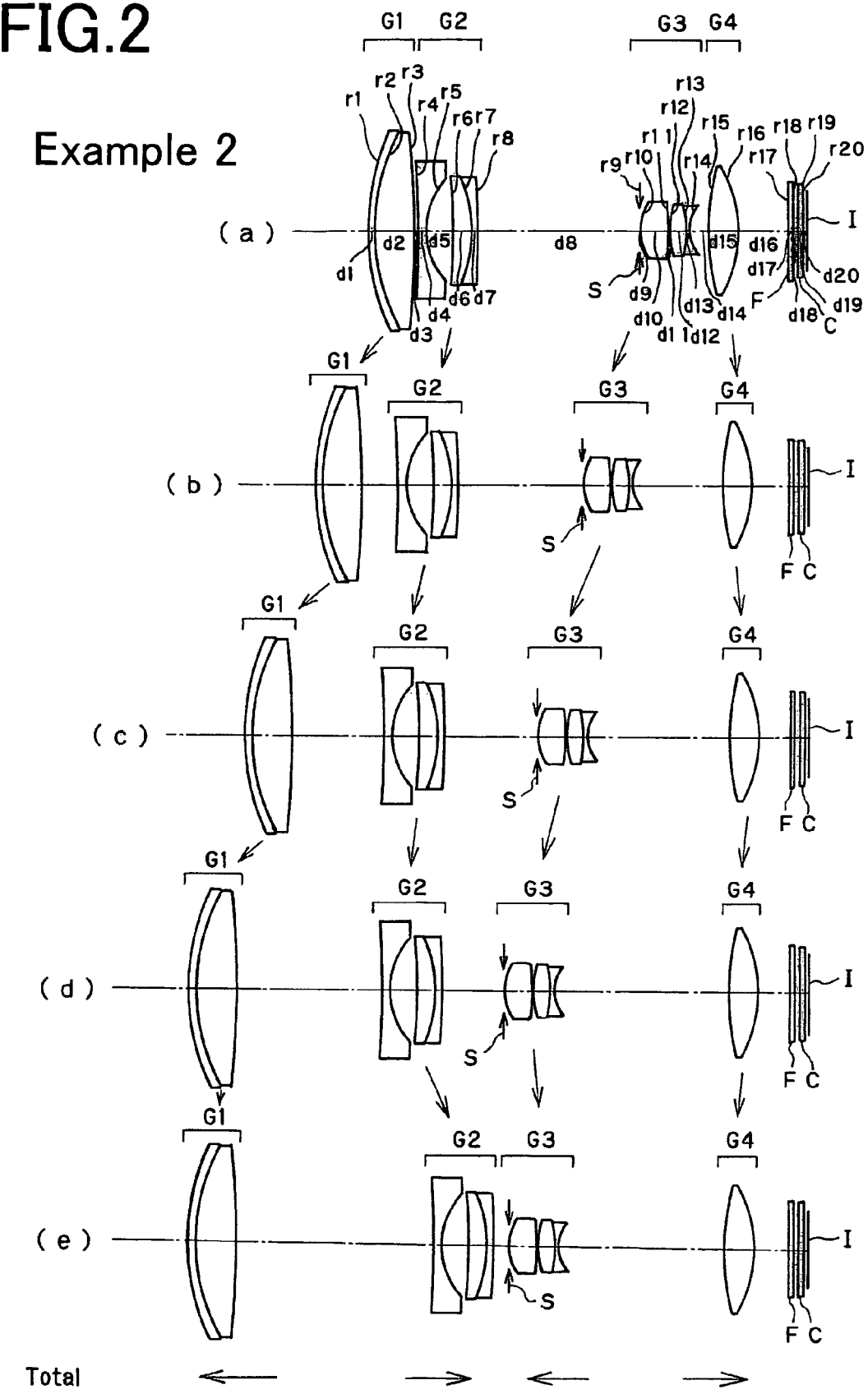
FIG. 2 is illustrative, as in FIG. 1, of Example 2 of the inventive zoom lens.
Figure 3:
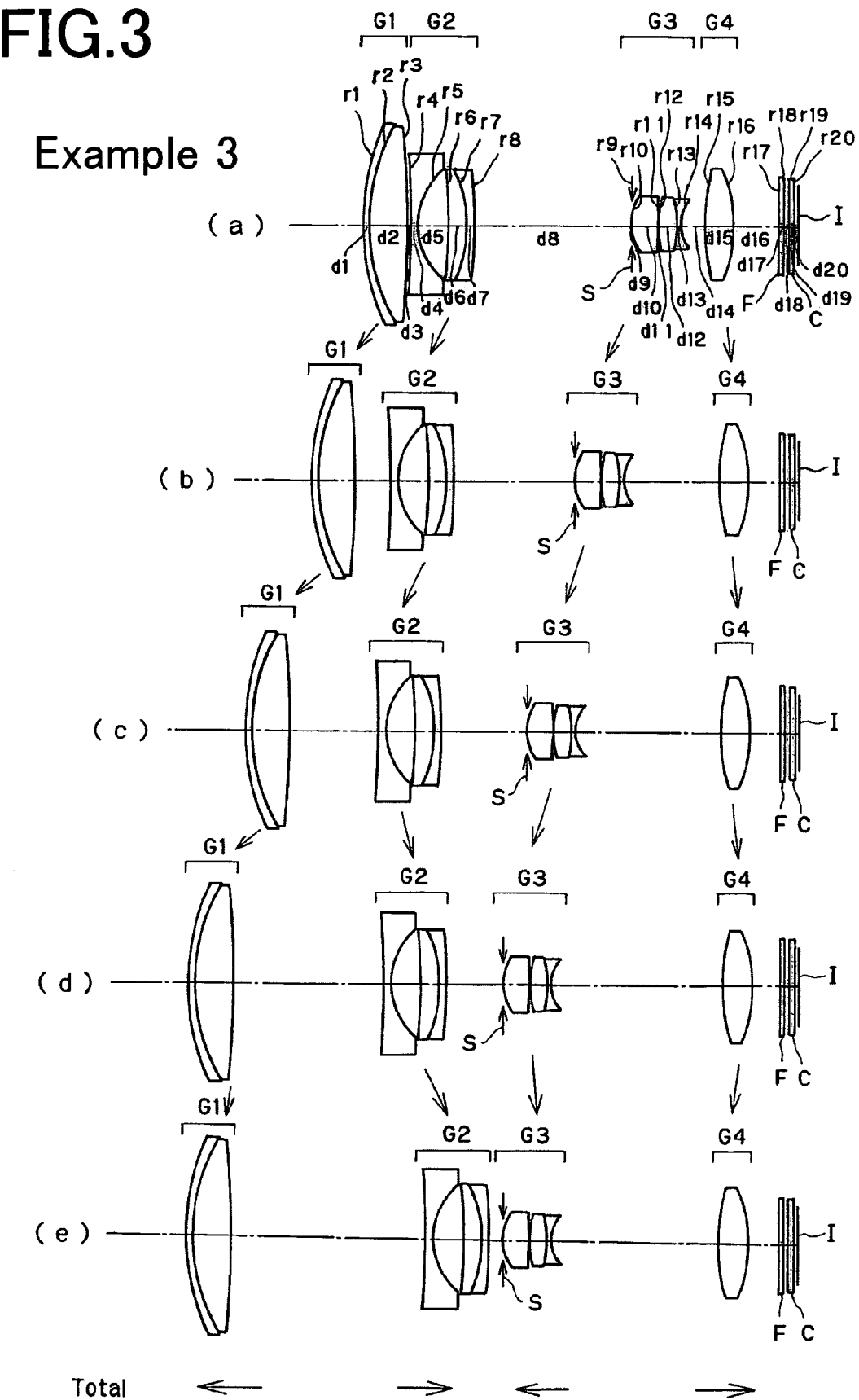
FIG. 3 is illustrative, as in FIG. 1, of Example 3 of the inventive zoom lens.
Figure 4:
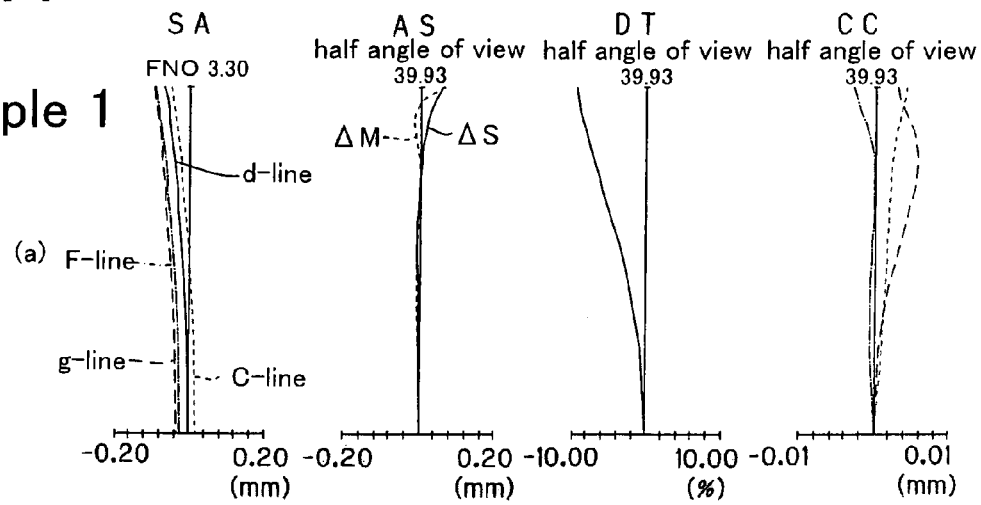
FIG. 4 is an aberration diagram for Example 1 upon focusing on an object point at infinity.
Figure 4:
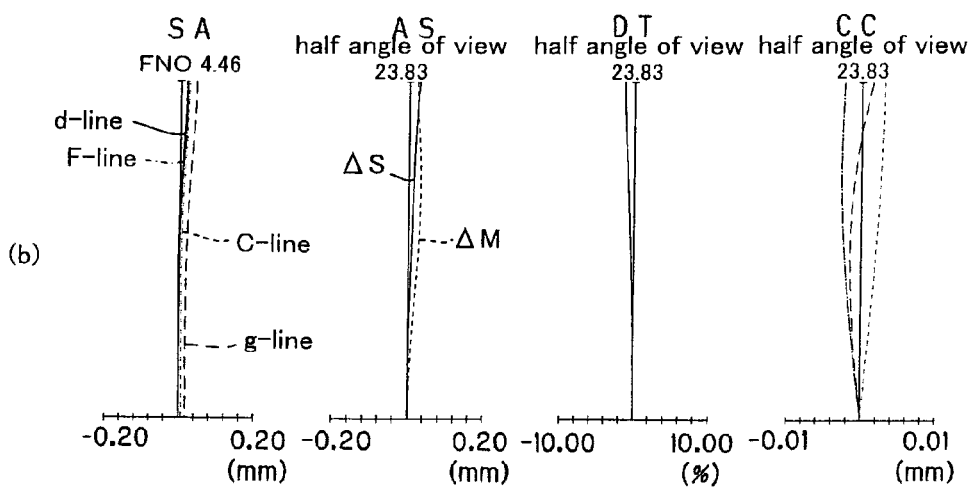
Figure 4:
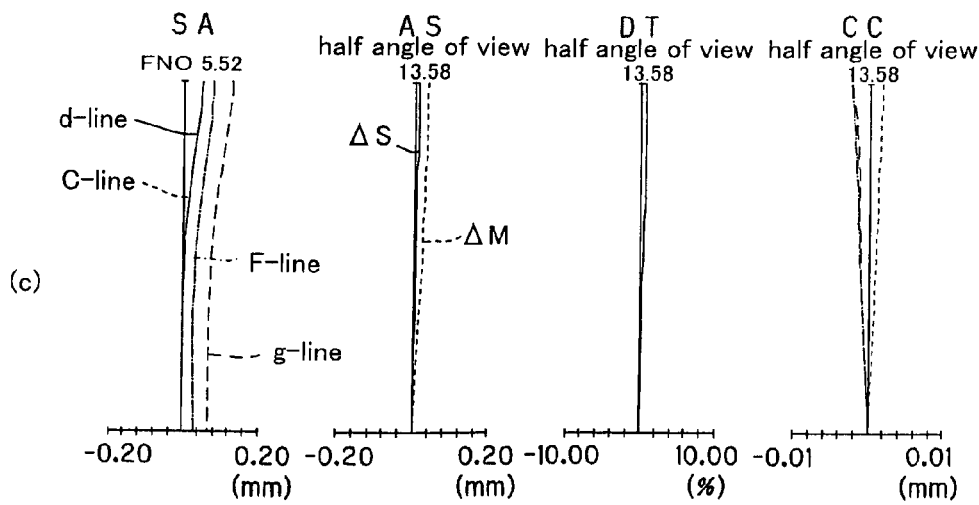
Figure 5:
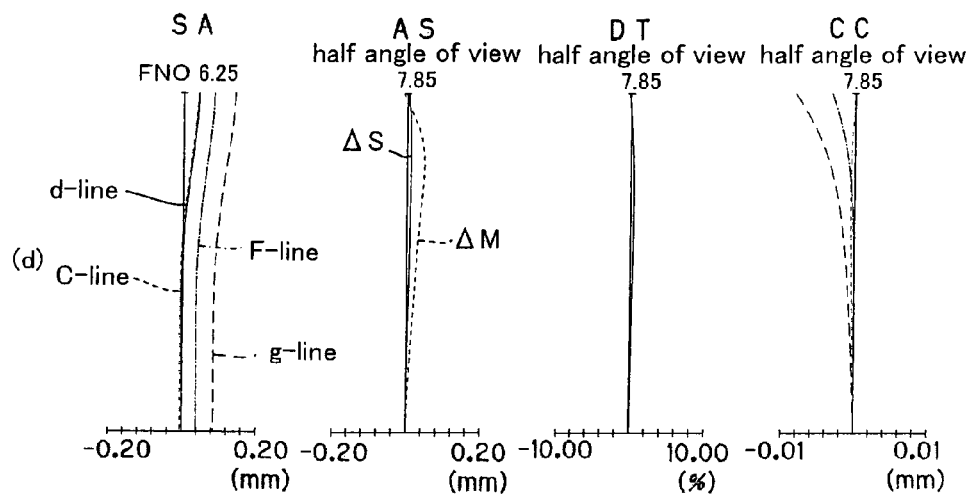
FIG. 5 is an aberration diagram for Example 1 upon focusing on an object point at infinity.
Figure 6:
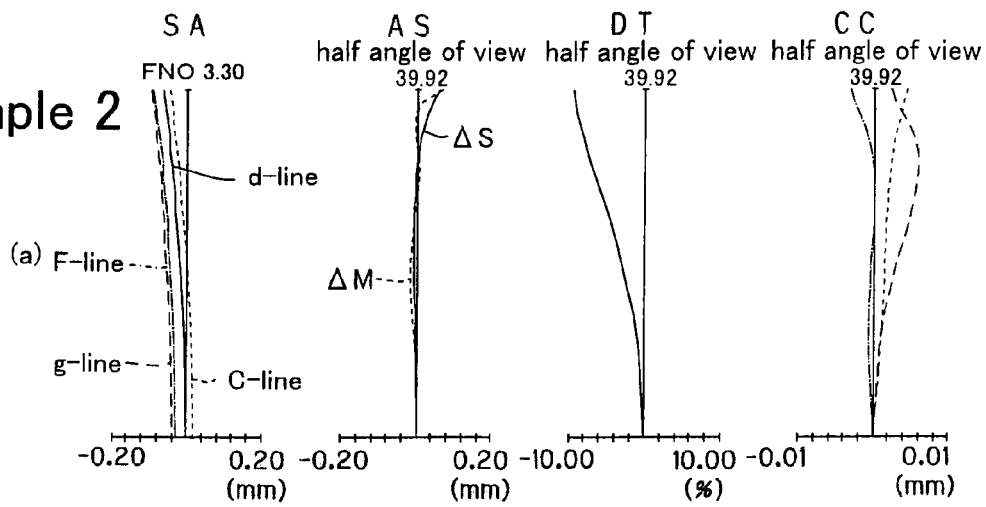
FIG. 6 is an aberration diagram for Example 2 upon focusing on an object point at infinity.
Figure 6:
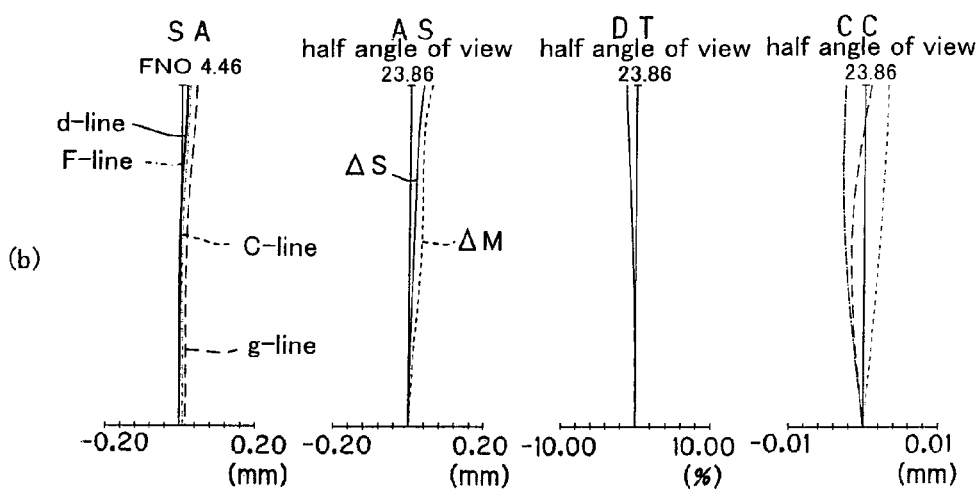
Figure 6:
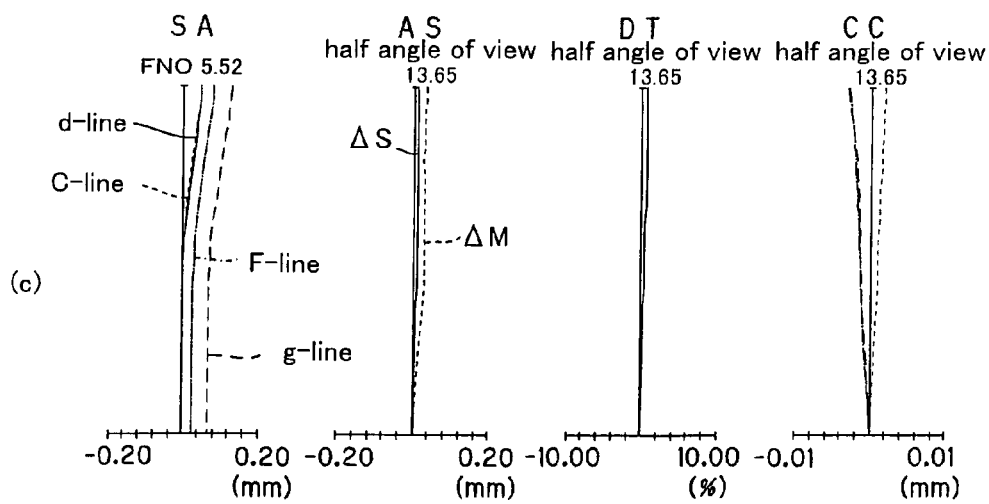
Figure 7:
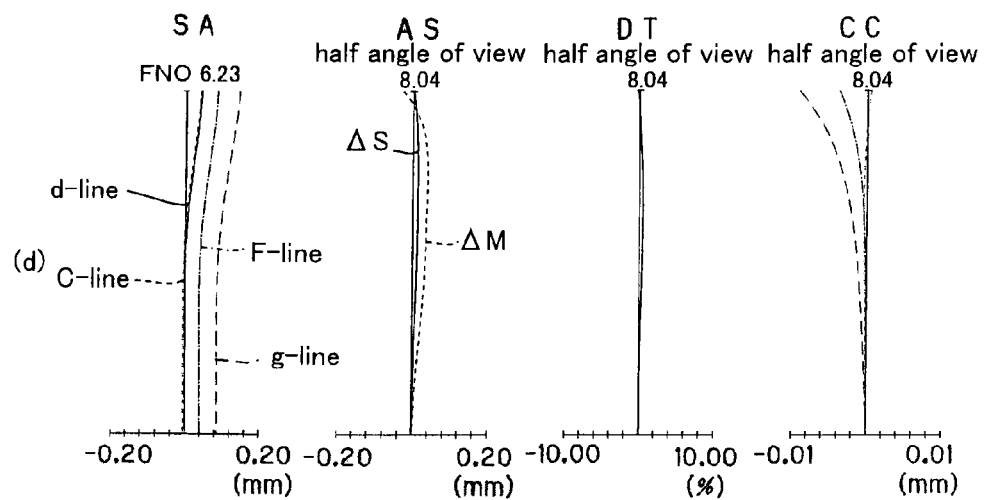
FIG. 7 is an aberration diagram for Example 2 upon focusing on an object point at infinity.
Figure 7:
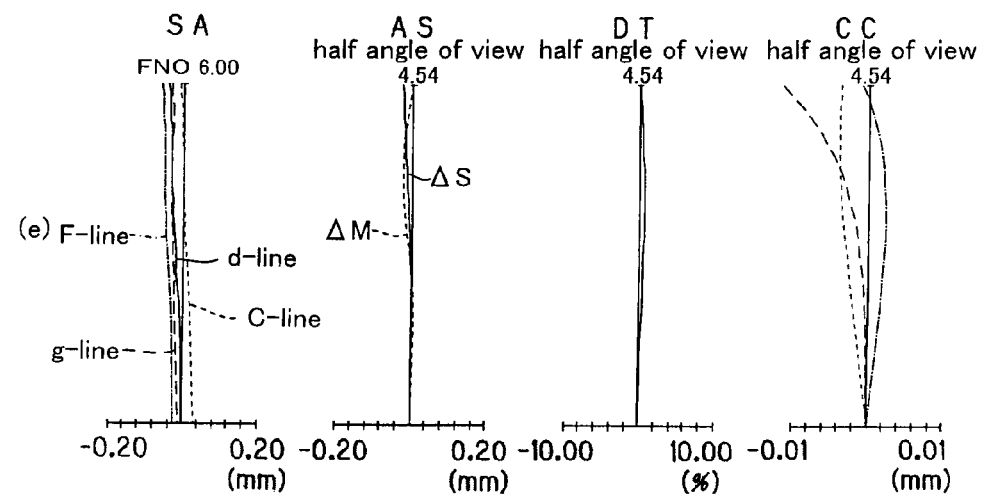
Figure 8:
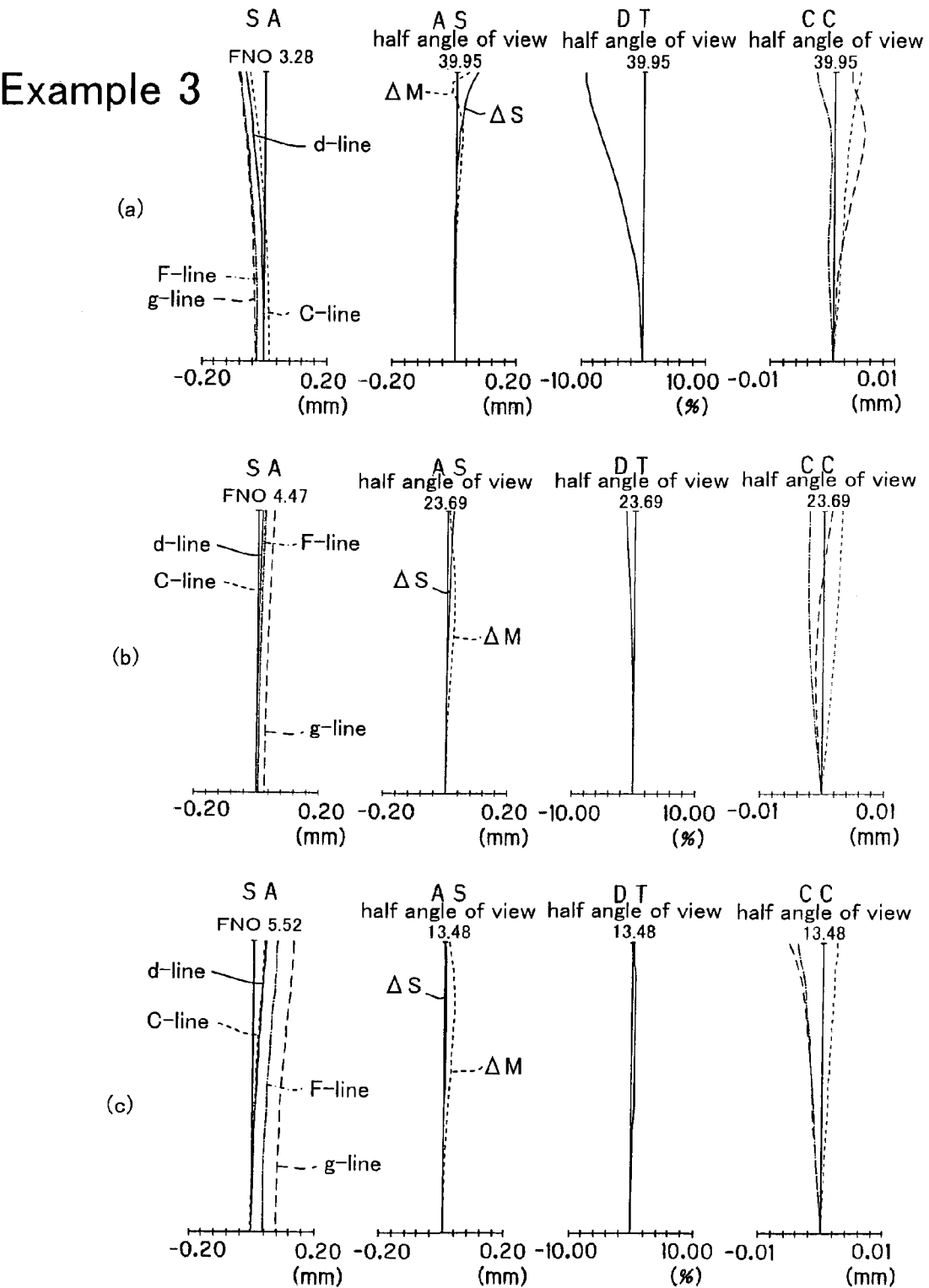
FIG. 8 is an aberration diagram for Example 3 upon focusing on an object point at infinity.
Figure 9:
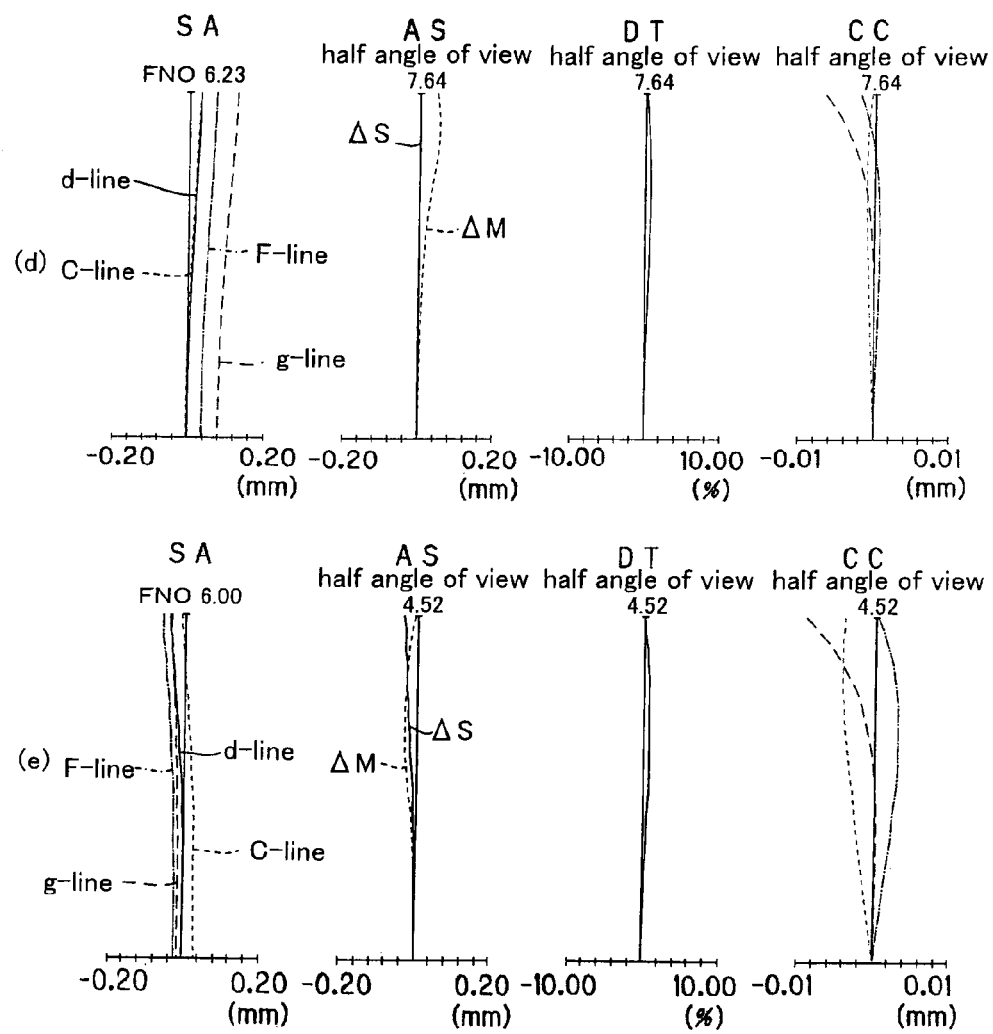
FIG. 9 is an aberration diagram for Example 3 upon focusing on an object point at infinity.

The zoom lenses of the invention are now explained with reference to Examples 1 to 3. FIGS. 1, 2 and 3 are illustrative in lens arrangement section of Examples 1 to 3 at the wide-angle end w (a), in the wide-angle side state, in the intermediate focal length state (c) (where the third lens group is positioned nearest to the object side), in the intermediate zooming state m (where the third lens group is positioned nearest to the object side), and at the telephoto end t upon focusing on an object point at infinity.

Throughout FIGS. 1, 2 and 3, G1 stands for the first lens group; G2 the second lens group; S the aperture stop; G3 the third lens group; G4 the fourth lens group; F an optical low-pass filter, C the cover glass of a CCD that is an electronic imaging device; and I the image plane of the CCD. Note here that for a near infrared sharp cut coating, for instance, it may be coated directly on the optical low-pass filter F or, alternatively, there may be another infrared cut absorption filter located.

It is here noted that the F-number grows greatest in the intermediate zooming state, and that the aperture stop S is going to have a constant round aperture shape irrespective of zooming. Focusing is implemented by the movement of the fourth lens group G4, and focusing from a far away object point to a nearby object point is implemented by the movement of the fourth lens group G4 toward the object side.

Example 1 is directed to a zoom lens made up of, in order from its object side, the first lens group G1 of positive refracting power, the aperture stop S, the second lens group G2 of negative refracting power, the third lens group G3 of positive refracting power and the fourth lens group G4 of positive refracting power, as shown in FIG. 1.

Upon zooming from the wide-angle end to the telephoto end, the respective lens groups move as follows. Throughout the disclosure, a state from the wide-angle end to the intermediate focal length state is defined as the wide-angle side state.

From the wide-angle end to the telephoto end, the first lens group G1 moves toward the object side.

From the wide-angle end to the intermediate zooming state, the second lens group G2 moves toward the object side while the spacing between the first lens group G1 and it grows wide and the spacing between it and the third lens group G3 becomes narrow; from the intermediate zooming state to the telephoto end, it moves toward the image side while the spacing between the first lens group G1 and it grows wide and the spacing between it and the third lens group G3 becomes narrow; and from the wide-angle end to the telephoto end, it moves in a convex locus toward the object side. At the telephoto end, the second lens group G2 is positioned more on the image side than at the wide-angle end.

From the wide-angle end to the intermediate zooming state, the aperture stop S and the third lens group G3 move in unison toward the object side while the spacing between the second lens group G2 and them becomes narrow and the spacing between them and the fourth lens group G4 grows wide; from the intermediate zooming state to the telephoto end, they move in unison toward the image side while the spacing between the second lens group G2 and them becomes narrow and the spacing between them and the fourth lens group G4 becomes narrow; and from the wide-angle end to the telephoto end, they move in a convex locus toward the object side. At the telephoto end, they are positioned more on the object side than in the intermediate focal length state.

From the wide-angle end to the intermediate focal length state, the fourth lens group G4 moves toward the image side with an increasing spacing between the third lens group G3 and it; from the intermediate focal length state to the intermediate zooming state, it moves toward the object side with an increasing spacing between the third lens group G3 and it; from the intermediate zooming state to the telephoto end, it moves toward the object side with a decreasing spacing between the third lens group G3 and it; and from the wide-angle end to the telephoto end, it moves in a convex locus toward the image side. At the telephoto end, the fourth lens group G4 is positioned more on the image side than in the wise-angle side state.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a double-convex positive lens and a double-concave negative lens; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, and two at both surfaces of the double-convex positive lens in the fourth lens group G4.

Example 2 is directed to a zoom lens made up of, in order from its object side, the first lens group G1 of positive refracting power, the aperture stop S, the second lens group G2 of negative refracting power, the third lens group G3 of positive refracting power and the fourth lens group G4 of positive refracting power, as shown in FIG. 2.

Upon zooming from the wide-angle end to the telephoto end, the respective lens groups move as follows.

From the wide-angle end to the telephoto end, the first lens group G1 moves toward the object side.

From the wide-angle end to the intermediate zooming state, the second lens group G2 moves toward the object side while the spacing between the first lens group G1 and it grows wide and the spacing between it and the third lens group G3 becomes narrow; from the intermediate zooming state to the telephoto end, it moves toward the image side while the spacing between the first lens group G1 and it grows wide and the spacing between it and the third lens group G3 becomes narrow; and from the wide-angle end to the telephoto end, it moves in a convex locus toward the object side. At the telephoto end, the second lens group G2 is positioned more on the image side than at the wide-angle end.

From the wide-angle end to the intermediate zooming state, the aperture stop S and the third lens group G3 move in unison toward the object side while the spacing between the second lens group G2 and them becomes narrow and the spacing between them and the fourth lens group G4 grows wide; from the intermediate zooming state to the telephoto end, they move in unison toward the image side while the spacing between the second lens group G2 and them becomes narrow and the spacing between them and the fourth lens group G4 becomes narrow; and from the wide-angle end to the telephoto end, they move in a convex locus toward the object side. At the telephoto end, they are positioned more on the object side than in the intermediate focal length state.

From the wide-angle end to the intermediate focal length state, the fourth lens group G4 moves toward the image side with an increasing spacing between the third lens group G3 and it; from the intermediate focal length state to the intermediate zooming state, it moves toward the object side with an increasing spacing between the third lens group G3 and it; from the intermediate zooming state to the telephoto end, it moves toward the object side with a decreasing spacing between the third lens group G3 and it; and from the wide-angle end to the telephoto end, it moves in a convex locus toward the image side. At the telephoto end, the fourth lens group G4 is positioned more on the image side than in the wise-angle side state.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a double-convex positive lens and a double-concave negative lens; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, and two at both surfaces of the double-convex positive lens in the fourth lens group G4.

Example 3 is directed to a zoom lens made up of, in order from its object side, the first lens group G1 of positive refracting power, the aperture stop S, the second lens group G2 of negative refracting power, the third lens group G3 of positive refracting power and the fourth lens group G4 of positive refracting power, as shown in FIG. 3.

Upon zooming from the wide-angle end to the telephoto end, the respective lens groups move as follows.

From the wide-angle end to the telephoto end, the first lens group G1 moves toward the object side.

From the wide-angle end to the intermediate focal length state, the second lens group G2 moves toward the object side while the spacing between the first lens group G1 and it grows wide and the spacing between it and the third lens group G3 becomes narrow; from the intermediate focal length state to the telephoto end, it moves toward the image side while the spacing between the first lens group G1 and it grows wide and the spacing between it and the third lens group G3 becomes narrow; and from the wide-angle end to the telephoto end, it moves in a convex locus toward the object side. At the telephoto end, the second lens group G2 is positioned more on the image side than at the wide-angle end.

From the wide-angle end to the intermediate zooming state, the aperture stop S and the third lens group G3 move in unison toward the object side while the spacing between the second lens group G2 and them becomes narrow and the spacing between them and the fourth lens group G4 grows wide; from the intermediate zooming state to the telephoto end, they move in unison toward the image side while the spacing between the second lens group G2 and them becomes narrow and the spacing between them and the fourth lens group G4 becomes narrow; and from the wide-angle end to the telephoto end, they move in a convex locus toward the object side. At the telephoto end, they are positioned more on the object side than in the intermediate focal length state.

From the wide-angle end to the intermediate zooming state, the fourth lens group G4 moves toward the image side with an increasing spacing between the third lens group G3 and it; from the intermediate zooming state to the telephoto end, it moves toward the object side with a decreasing spacing between the third lens group G3 and it; and from the wide-angle end to the telephoto end, it moves in a convex locus toward the image side. At the telephoto end, the fourth lens group G4 is positioned more on the image side than in the wise-angle side state, and more on the object side than in the intermediate focal length state.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a double-convex positive lens and a double-concave negative lens; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, and two at both surfaces of the double-convex positive lens in the fourth lens group G4.

Each zoom lens that embodies the invention may as well be used for electrical correction of aberrations (e.g., distortion). With the zoom lens of each example, there is barrel distortion produced on a rectangular photoelectric transformation plane near the wide-angle end. On the other hand, there are changes in the occurrence of distortion in the vicinity of the intermediate focal length state or at the telephoto end.

For electrical correction of distortion, for instance, the effective imaging area is variable or otherwise configured into a barrel shape at the wide-angle end and a rectangular shape in the intermediate focal length state or at the telephoto end.

The maximum image height IHw at the wide-angle end is preferably lower than the maximum image height IHs in the intermediate focal length state or the maximum image height IHt at the telephoto end. For instance, the effective imaging area is determined such that the length at the wide-angle end of the photoelectric transformation plane in the short-side direction is the same as the length of the effective imaging area in the short-side direction, and there is about −3% of distortion still remaining after image processing; however, of course, an image transformed into a rectangular shape with a smaller barrel area used as the effective imaging area may be recorded and reproduced.

Set out below are the numerical data about the zoom lens of each example.

Symbols mentioned hereinafter but not hereinbefore have the following meanings:

r is the radius of curvature of each lens surface, d is the thickness of or spacing across each lens, nd is the d-line refractive index of each lens, vd is the d-line Abbe constant of each lens, K is the conic coefficient, A4, A6, A8, and A10 is the aspheric coefficient, and E±N is ×10$^{±N}$.

Note here that each aspheric shape is given by the following equation using each aspheric coefficient in each example.

$$Z=(Y^2/r)/[1+\{1-(K+1)\cdot(Y/r)^2\}^{1/2}]+A4\times Y^4+A6\times Y^6+A8\times Y^8+A10\times Y^{10}$$

Here Z is the coordinates in the optical axis direction, and Y is the coordinates in the direction vertical to the optical axis.

NUMERICAL EXAMPLE 1

Unit mm

Surface data

| Surface No. | r | d | nd | vd |
|---|---|---|---|---|
| 1 | 24.303 | 0.60 | 1.94595 | 17.98 |
| 2 | 20.214 | 3.76 | 1.59201 | 67.02 |
| 3 (Aspheric surface) | −81.890 | Variable | | |
| 4 (Aspheric surface) | −126.121 | 0.80 | 1.85135 | 40.10 |
| 5 (Aspheric surface) | 7.298 | 2.55 | | |
| 6 | −47.821 | 1.82 | 1.94595 | 17.98 |
| 7 | −12.243 | 0.70 | 1.77377 | 47.17 |
| 8 (Aspheric surface) | 1048.205 | Variable | | |
| 9 (Stop) | ∞ | 0.00 | | |
| 10 (Aspheric surface) | 4.740 | 2.61 | 1.59201 | 67.02 |
| 11 (Aspheric surface) | −24.526 | 0.10 | | |
| 12 | 8.362 | 1.56 | 1.49700 | 81.54 |
| 13 | −11.267 | 0.42 | 1.62004 | 36.26 |
| 14 | 3.425 | Variable | | |
| 15 (Aspheric surface) | 23.304 | 2.94 | 1.58913 | 61.14 |
| 16 (Aspheric surface) | −14.592 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane | ∞ | | | |

Aspheric surface data

3$^{rd}$ surface

K = 0.000, A4 = 9.98895E−06, A6 = −1.42502E−08, A8 = 1.40262E−10, A10 = −7.79860E−13

4$^{th}$ surface

K = 0.000, A4 = 1.42993E−05, A6 = −3.36962E−06, A8 = 6.97681E−08, A10 = −5.69362E−10

5$^{th}$ surface

K = 0.028, A4 = 2.04098E−04, A6 = −1.50503E−06, A8 = 1.91466E−07, A10 = −1.44606E−08

8$^{th}$ surface

K = 0.104, A4 = −3.08161E−04, A6 = −3.71109E−06, A8 = 1.80523E−07

10$^{th}$ surface

K = 0.000, A4 = −4.81405E−04, A6 = 6.75956E−06, A8 = −4.24430E−07, A10 = 3.05963E−07

11$^{th}$ surface

K = 0.000, A4 = 1.00467E−03, A6 = 4.70567E−05, A8 = −1.92213E−06, A10 = 8.59706E−07

15$^{th}$ surface

K = 0.163, A4 = 1.85121E−05, A6 = 4.98422E−06, A8 = −8.22837E−07, A10 = 1.70212E−08

16$^{th}$ surface

K = 0.027, A4 = 3.00013E−05, A6 = 1.96174E−06, A8 = −7.90283E−07, A10 = 1.71060E−08

Zoom lens data

Zoom ratio 9.61

| | Wide-angle | Wide-angle side | Intermediate focal length |
|---|---|---|---|
| Focal length | 5.12 | 8.91 | 15.95 |
| F-number | 3.30 | 4.46 | 5.52 |
| Angle of view | 79.85 | 47.66 | 27.17 |
| Image height | 3.88 | 3.88 | 3.88 |
| Total lens length | 41.86 | 46.88 | 53.51 |
| BF | 6.35 | 5.08 | 4.38 |
| d3 | 0.30 | 3.39 | 8.76 |
| d8 | 15.57 | 11.93 | 8.95 |
| d14 | 1.79 | 8.63 | 13.56 |
| d16 | 4.84 | 3.63 | 2.97 |

| | Intermediate zooming | Telephoto |
|---|---|---|
| Focal length | 28.33 | 49.23 |
| F-number | 6.25 | 6.01 |
| Angle of view | 15.71 | 9.05 |
| Image height | 3.88 | 3.88 |
| Total lens length | 58.81 | 58.81 |
| BF | 4.45 | 4.88 |
| d3 | 14.00 | 18.86 |
| d8 | 5.85 | 1.47 |
| d14 | 16.65 | 15.73 |
| d16 | 3.03 | 3.39 |

Data on zoom lens groups

| Group | Starting surface | Focal length |
|---|---|---|
| 1 | 1 | 35.22 |
| 2 | 4 | −7.67 |
| 3 | 10 | 11.44 |
| 4 | 15 | 15.68 |

NUMERICAL EXAMPLE 2

Unit mm

Surface data

| Surface No. | r | d | nd | vd |
|---|---|---|---|---|
| 1 | 24.303 | 0.60 | 1.94595 | 17.98 |
| 2 | 20.237 | 3.76 | 1.59201 | 67.02 |
| 3 (Aspheric surface) | −82.436 | Variable | | |
| 4 (Aspheric surface) | −219.740 | 0.80 | 1.85135 | 40.10 |
| 5 (Aspheric surface) | 7.141 | 2.53 | | |
| 6 | −47.821 | 1.82 | 1.94595 | 17.98 |
| 7 | −12.245 | 0.70 | 1.77377 | 47.17 |
| 8 (Aspheric surface) | 919.839 | Variable | | |
| 9 (Stop) | ∞ | 0.00 | | |
| 10 (Aspheric surface) | 4.768 | 2.63 | 1.59201 | 67.02 |
| 11 (Aspheric surface) | −24.563 | 0.10 | | |
| 12 | 8.337 | 1.59 | 1.49700 | 81.54 |
| 13 | −10.981 | 0.42 | 1.62004 | 36.26 |
| 14 | 3.430 | Variable | | |
| 15 (Aspheric surface) | 21.480 | 2.76 | 1.58313 | 59.38 |
| 16 (Aspheric surface) | −15.083 | Variable | | |
| 17 | ∞ | 0.40 | 1.54771 | 62.84 |
| 18 | ∞ | 0.50 | | |

-continued

Unit mm

| | | | | |
|---|---|---|---|---|
| 19 | ∞ | 0.50 | 1.51633 | 64.14 |
| 20 | ∞ | 0.37 | | |
| Image plane | ∞ | | | |

Aspheric surface data $3^{rd}$ surface

K = 0.000, A4 = 9.88614E−06, A6 = −1.28397E−08, A8 = 1.38079E−10, A10 = −8.10609E−13

$4^{th}$ surface

K = 0.000, A4 = −1.03099E−04, A6 = −1.36657E−07, A8 = 2.92640E−08, A10 = −3.65204E−10

$5^{th}$ surface

K = 0.023, A4 = 7.26110E−05, A6 = −2.75668E−06, A8 = 3.09987E−07, A10 = −1.63736E−08

$8^{th}$ surface

K = 0.063, A4 = −3.13000E−04, A6 = −2.92989E−06, A8 = 1.78401E−07

$10^{th}$ surface

K = 0.000, A4 = −4.61273E−04, A6 = 5.42473E−06, A8 = −4.53290E−07, A10 = 2.94654E−07

$11^{th}$ surface

K = 0.000, A4 = 1.00343E−03, A6 = 4.28360E−05, A8 = −1.89374E−06, A10 = 8.23287E−07

$15^{th}$ surface

K = 0.149, A4 = 2.11614E−05, A6 = 2.04085E−06, A8 = −5.91451E−07, A10 = 1.16248E−08

$16^{th}$ surface

K = 0.029, A4 = 5.23199E−05, A6 = −5.01045E−06, A8 = −3.86855E−07, A10 = 9.37526E−09

Zoom lens data

Zoom ratio 9.59

| | Wide-angle | Wide-angle side | Intermediate focal length |
|---|---|---|---|
| Focal length | 5.12 | 8.90 | 15.88 |
| F-number | 3.30 | 4.46 | 5.52 |
| Angle of view | 79.84 | 47.73 | 27.30 |
| Image height | 3.88 | 3.88 | 3.88 |
| Total lens length | 41.69 | 46.74 | 53.41 |
| BF | 6.40 | 5.18 | 4.48 |
| d3 | 0.30 | 3.40 | 8.75 |
| d8 | 15.57 | 11.92 | 8.99 |
| d14 | 1.72 | 8.54 | 13.49 |
| d16 | 4.89 | 3.73 | 3.06 |

| | Intermediate zooming | Telephoto |
|---|---|---|
| Focal length | 27.70 | 49.14 |
| F-number | 6.23 | 6.00 |
| Angle of view | 16.08 | 9.08 |
| Image height | 3.88 | 3.88 |
| Total lens length | 58.62 | 58.71 |
| BF | 4.53 | 4.94 |
| d3 | 13.81 | 18.86 |
| d8 | 5.99 | 1.48 |
| d14 | 16.59 | 15.72 |
| d16 | 3.11 | 3.45 |

Data on zoom lens groups

| Group | Starting surface | Focal length |
|---|---|---|
| 1 | 1 | 35.25 |
| 2 | 4 | −7.69 |
| 3 | 10 | 11.45 |
| 4 | 15 | 15.63 |

NUMERICAL EXAMPLE 3

Unit mm

Surface data

| Surface No. | r | d | nd | νd |
|---|---|---|---|---|
| 1 | 23.990 | 0.60 | 1.94595 | 17.98 |
| 2 | 20.019 | 3.61 | 1.59201 | 67.02 |
| 3 (Aspheric surface) | −81.323 | Variable | | |
| 4 (Aspheric surface) | −120.343 | 0.80 | 1.85135 | 40.10 |
| 5 (Aspheric surface) | 7.138 | 2.77 | | |
| 6 | −48.976 | 1.72 | 1.94595 | 17.98 |
| 7 | −12.251 | 0.70 | 1.77377 | 47.17 |
| 8 (Aspheric surface) | 1310.386 | Variable | | |
| 9 (Stop) | ∞ | 0.00 | | |
| 10 (Aspheric surface) | 4.648 | 2.44 | 1.59201 | 67.02 |
| 11 (Aspheric surface) | −25.249 | 0.10 | | |
| 12 | 8.391 | 1.69 | 1.49700 | 81.54 |
| 13 | −9.075 | 0.41 | 1.62004 | 36.26 |
| 14 | 3.396 | Variable | | |
| 15 (Aspheric surface) | 19.261 | 2.73 | 1.58313 | 59.38 |
| 16 (Aspheric surface) | −15.256 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane | ∞ | | | |

Aspheric surface data $3^{rd}$ surface

K = 0.000, A4 = 1.03825E−05, A6 = −1.09686E−08, A8 = 1.03239E−10, A10 = −7.05480E−13

$4^{th}$ surface

K = 0.000, A4 = 2.53758E−05, A6 = −2.04119E−06, A8 = −5.21683E−09, A10 = 1.10039E−09, A12 = −1.40661E−11

$5^{th}$ surface

K = 0.000, A4 = 1.79565E−04, A6 = 5.92840E−06, A8 = −2.40236E−07, A10 = 7.83407E−10, A12 = −2.27842E−10

$8^{th}$ surface

K = 0.000, A4 = −2.85375E−04, A6 = −6.34205E−06, A8 = 3.63832E−07, A10 = −6.27532E−09, A12 = 7.03393E−11

$10^{th}$ surface

K = 0.000, A4 = −3.49019E−04, A6 = 1.94245E−05, A8 = 2.17727E−06, A10 = −1.06653E−07, A12 = 4.92651E−08

$11^{th}$ surface

K = 0.000, A4 = 1.29940E−03, A6 = 5.92894E−05, A8 = 4.07093E−06, A10 = −1.60185E−07, A12 = 1.46040E−07

$15^{th}$ surface

K = 2.172, A4 = 7.72343E−05, A6 = −1.12668E−06, A8 = −4.04629E−07, A10 = 7.67814E−09

-continued

Unit mm

16th surface

K = −0.705, A4 = 1.42731E−04, A6 = −8.06584E−06,
A8 = −3.02058E−07, A10 = 8.22055E−09

Zoom lens data

Zoom ratio  9.63

|  | Wide-angle | Wide-angle side | Intermediate focal length |
|---|---|---|---|
| Focal length | 5.06 | 8.86 | 15.96 |
| F-number | 3.28 | 4.47 | 5.52 |
| Angle of view | 79.89 | 47.38 | 26.97 |
| Image height | 3.83 | 3.83 | 3.83 |
| Total lens length | 41.21 | 46.22 | 52.48 |
| BF | 5.92 | 4.56 | 4.35 |
| d3 | 0.30 | 3.35 | 8.46 |
| d8 | 15.14 | 11.64 | 8.26 |
| d14 | 2.27 | 9.10 | 13.84 |
| d16 | 4.42 | 3.12 | 2.93 |

|  | Intermediate zooming | Telephoto |
|---|---|---|
| Focal length | 28.69 | 48.70 |
| F-number | 6.12 | 6.00 |
| Angle of view | 15.28 | 9.05 |
| Image height | 3.83 | 3.83 |
| Total lens length | 57.79 | 57.97 |
| BF | 4.15 | 4.49 |
| d3 | 14.29 | 18.62 |
| d8 | 5.48 | 1.38 |
| d14 | 16.29 | 15.91 |
| d16 | 2.74 | 3.00 |

Data on zoom lens groups

| Group | Starting surface | Focal length |
|---|---|---|
| 1 | 1 | 34.73 |
| 2 | 4 | −7.53 |
| 3 | 10 | 11.17 |
| 4 | 15 | 15.04 |

FIGS. 4 to 9 are aberration diagrams for Examples 1, 2 and 3 upon focusing on an object point at infinity. In these aberration diagrams, (a), (b), (c), (d) and (e) are indicative of spherical aberrations, astigmatism, distortion and chromatic aberration of magnification at the wide-angle end, in the wide-angle side state, in the intermediate focal length state, in the intermediate zooming state, and at the telephoto end, respectively.

Tabulated below are the values of conditions (1) to (8) in Examples 1, 2 and 3.

| Condition | Example 1 | Example 2 | Example 3 |
|---|---|---|---|
| Fno (w) | 3.30 | 3.20 | 3.28 |
| Fno (t) | 6.01 | 6.00 | 6.00 |
| Fno (m) | 6.25 | 6.23 | 6.12 |
| fw | 5.12 | 5.12 | 5.06 |
| ft | 49.23 | 49.14 | 48.70 |
| fm | 28.33 | 27.70 | 28.69 |
| f1 | 35.22 | 35.25 | 34.73 |
| f2 | −7.67 | −7.69 | −7.53 |
| f3 | 11.44 | 11.45 | 11.17 |
| f4 | 15.68 | 15.63 | 15.04 |
| Lt | 59.14 | 59.04 | 58.30 |
| T1w | 42.19 | 42.01 | 41.54 |
| T1t | 59.14 | 59.04 | 58.30 |

-continued

| Condition | Example 1 | Example 2 | Example 3 |
|---|---|---|---|
| T1m | 59.14 | 58.95 | 58.12 |
| T3w | 14.26 | 14.11 | 14.07 |
| T3t | 26.76 | 26.67 | 26.28 |
| T3m | 29.06 | 28.94 | 28.14 |
| (1) | 0.19 | 0.19 | 0.19 |
| (2) | 1.04 | 1.04 | 1.02 |
| (3) | 1.20 | 1.20 | 1.20 |
| (4) | 2.25 | 2.25 | 2.31 |
| (5) | 1.49 | 1.49 | 1.48 |
| (6) | 1.00 | 0.99 | 0.99 |
| (7) | 1.18 | 1.18 | 1.15 |
| (8) | 0.58 | 0.56 | 0.59 |

Each example may be modified as follows.

With the zoom lens of each example, there is barrel distortion produced on the rectangular photoelectric transformation plane at the wide-angle end. On the other hand, distortion is prevented from occurring in the vicinity of the intermediate focal length state or at the telephoto end. For electrical correction of distortion, the effective imaging area is configured into a barrel shape at the wide-angle end and a rectangular shape in the intermediate focal length state or at the telephoto end. And the preset effective imaging area is subjected by image processing to image transformation; it is transformed into rectangular image information with decreased distortion. An image height Imw at the wide-angle end is supposed to be lower than an image height Ims in the intermediate focal length state or an image height Imt at the telephoto end.

Figure 10:
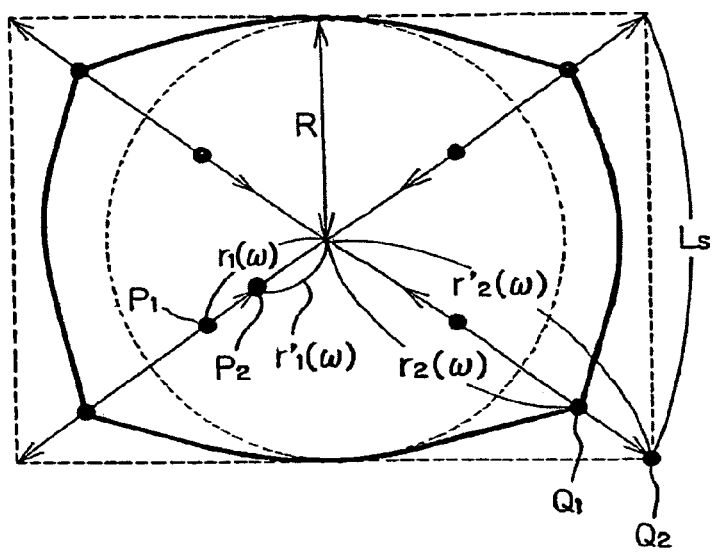
FIG. 10 is illustrative of correction of distortion.

As shown typically in FIG. 10, there is a magnification fixed on the circumference (image height) of a circle of radius R inscribed in the long side of an effective imaging plane with the point of intersection of an optical axis with the imaging plane as a center, and that circumference is used as the reference for correction. And then, points on the circumference of other arbitrary circle of radius r(ω) are moved in substantially radial directions; they are concentrically moved to a radius r (ω) for correction. In FIG. 27 as an example, a point $P_1$ on the circumference of an arbitrary circle of radius $r_1$ (ω) positioned inside the circle of radius R is moved to a point $P_2$ on the circumference of an arbitrary circle of radius $r_2$ to be corrected in a direction toward the center of the circle. On the other hand, a point $Q_1$ on the circumference of an arbitrary circle of radius $r_2(ω)$ positioned outside the circle of radius R is moved to a point $Q_2$ on the circumference of a circle of radius $r_2$ (ω) to be corrected in a direction away from the center of the circle. Here, r (ω) may be represented by $$r(ω)=αf\tan ω \; (0 \leq α \leq 1)$$

where ω is a subject half angle of view, and f is the focal length of an imaging optical system (the zoom optical system in the invention).

Here let Y be an ideal image height corresponding to on the aforesaid circle (image height) of radius R. Then, $$α=R/Y=R/f\tan ω$$

The optical system here is ideally rotationally symmetric about the optical axis; distortion occurs rotationally symmetrically about the optical axis, too. Therefore, when optically produced distortion is electrically corrected as described above, it would be favorable in view of the quantities of data and computation to implement correction by fixing, on a reproduced image, a magnification on the circumference (image height) of the circle of radius R inscribed in the long side of an effective imaging plane with the point of intersection of an optical axis with the imaging plane as a center, and moving points on the circumference (image height) of other arbitrary circle of radius r(ω) moved in substantially radial directions to move them concentrically to radius r (ω).

However, an optical image stops being a continuous quantity (for sampling) at the time of being imaged at an electronic imaging device. Strictly speaking, therefore, the aforesaid circle of radius R drawn on the optical image, too, stops being an accurate circle unless pixels on the electronic imaging device are lined up in a radial way. It follows that when it comes to the shape correction of image data represented per discrete coordinate point, there is none of the circle capable of fixing the aforesaid circle. It is therefore preferable to make use of a method that determines coordinates $(X_i, Y_j)$ for where the points are to be moved to per each pixel $(X_i, Y_j)$. Note that when two or more points $(X_i, Y_j)$ are moved to the coordinates $(X_i, Y_j)$, there is the average of the values the respective pixels have taken, and when there are no incoming points, interpolation may be implemented using the values of the coordinates $(X_i, Y_j)$ for some neighboring pixels.

Such a method is effective for especially when the aforesaid circle of radius R written on the aforesaid optical image becomes badly distorted and asymmetric with respect to the optical axis for the reason of fabrication errors of the optical system and electronic imaging device of an electronic imaging apparatus the zoom lens has. That method is also effective for correction of geometric distortion or the like occurring at the time of reproduction of signals as an image at the imaging device or various output devices.

With the electronic imaging apparatus of the invention, r(ω), i.e., the relation between the half angle of view and the image height or the relation between the real image height r and the ideal image height r/α may have been recorded in a recording medium built in it for the purpose of figuring out r (ω)–r(ω).

It is here noted that to prevent the image after the correction of distortion from running extremely short of light quantity at both ends in the short side direction, it is preferable for the aforesaid radius R to satisfy the following condition:

$$0 \leq R \leq 0.6 L_s$$

where $L_s$ is the length of the short side of the effective imaging plane.

For the aforesaid radius R it is more preferable to satisfy the following condition.

$$0.3 L_s \leq R \leq 0.6 L_s$$

Most preferably, the aforesaid radius R should be much the same as that of a circle inscribed in the effective imaging plane in the short side direction. Note here that the correction with the magnification fixed at or near the radius R=0, viz., at or near the optical axis is somewhat disadvantageous in terms of the substantial number of pixels; even in a wide-angle arrangement, however, there is the advantage of compactness still ensured.

It is noted that the focal length interval for which correction is in need is divided into several focal zones. And then, correction may be implemented in the same quantity as there is the result of correction obtained which satisfies substantially r (ω)=αf tan ω at or near the telephoto end within the divided focal zones. In that case, however, there is some barrel distortion still remaining at the wide-angle end within the divided focal zones. Too many divided zones are not that preferable because of the need of storing too much intrinsic data necessary for correction in the recording medium. Therefore, one or a few coefficients in association with the focal lengths in the divided focal zones have been figured out in advance. Such coefficients may have been determined on the basis of simulations or measuring devices. And then, there is the quantity of correction worked out corresponding to the result of correction that satisfies substantially r (ω)=αf tan ω at or near the telephoto end within the divided focal zones, and that amount of correction may be evenly multiplied by the aforesaid coefficients per focal length to obtain the final quantity of correction.

By the way, when there is no distortion in the image obtained by imaging an infinite object, $$f = y/\tan \omega$$

Here y is the height (image height) of an image point from the optical axis, f is the focal length of an imaging apparatus (the zoom lens in the invention), and ω is the angle (subject half angle of view) with the optical axis of an object point direction corresponding to an image point formed from the center on the imaging plane to the position of y.

When there is barrel distortion in the imaging apparatus, $$f > y/\tan \omega$$

It follows that with both the focal length f of the imaging apparatus and the image height y kept constant, the value of ω grows large.

Preferably, the zoom lens has an image transformation block in which electric signals for an image taken through the zoom lens are transformed into image signals that are corrected by image processing for color shifts from chromatic aberration of magnification. Electric correction of the zoom lens for chromatic aberration of magnification is going to make sure much better images are obtained.

Generally speaking, an electronic still camera is designed such that the image of a subject is separated into three primary colors images: the first, the second and the third primary color image, so that the respective output signals are superposed one upon another by operation to reconstruct a color image. Suppose here that a zoom lens has chromatic aberration of magnification. Then, given an image from light of the first primary color, the positions where light of the second and the third primary color is imaged are going to be off the position where the light of the first primary color is imaged. For electronic correction of the image for chromatic aberration of magnification, the amount of shifts of the imaging positions for the second and the third primary color from that for the first primary color is previously found for each pixel of an imaging device based on aberration information about the zoom lens. Then, coordination transformation is implemented such that only the amount of the shifts from the first primary color is corrected for each pixel of the taken image.

Referring typically to an image made up of three primary colors output signals of red (R), green (G) and blue (B), shifts of the imaging positions R and B from G are first found for each pixel. Then, coordination transformation is applied to the taken image to eliminate any shift from G, and finally signals of R and G are produced.

Chromatic aberration of magnification varies with zoom, focus and f numbers; it is preferable that the amount of shifts of the second and the third primary color from the first primary color is stored as correction data in a storage device for each lens position (zoom, focus and f numbers). By referring to this correction data depending on the zoom position, it is possible to produce the second and the third primary color signals that are corrected for the shifts of the second and the third primary color from the first primary color signal.

To cut off unessential light such as ghosts and flares, it is acceptable to rely on a flare stop other than the aperture stop.

That flare stop may then be located somewhere on the object side of the first lens group, between the first and the second lens group, between the second and the third lens group, between the third and the fourth lens group, between the fourth and the fifth lens group, and the lens group located nearest to the image plane side and the image plane. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen, etc. may be cut off.

Each lens may be applied with an antireflection coating to reduce ghosts and flares. A multicoating is then desired because of being capable of effectively reducing ghosts and flares. Each lens, a cover glass or the like may just as well be applied with an infrared cut coating.

Desirously, focusing for adjusting the focus is implemented with the lens group located nearest to the image plane side. Focusing with the lens group located nearest to the image plane side eases off loads on a motor because the lens weight is light, and works for making the lens barrel compact because there is none of the change in the total length during zooming, and a drive motor is mounted in the lens barrel.

As noted just above, it is desired that focusing be implemented with the lens group located nearest to the image plane side; however, it may be implemented with the first, the second or the third lens group, or by the movement of multiple lens groups. The movement of multiple lens groups contributes to more efficient prevention of performance deterioration in association with focusing. Furthermore, focusing may be implemented by letting out the whole lens system or letting out or in some lenses.

The shading of brightness at the peripheral portion of an image may be reduced by shifting the mircolenses of a CCD. For instance, the CCD microlens design may be modified in conformity with the angle of incidence of light rays at each image height, or decreases in the quantity of light at the peripheral position of the image may be corrected by image processing.

An antireflection coating is generally applied to the air contact surface of a lens for the purpose of preventing ghosts and flares. At the cementing surface of a cemented lens, on the other hand, the refractive index of an adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, which could in turn make sure images of better quality.

Especially in recent years, vitreous materials having high refractive indices have gained popularity, and they have often been used with camera optical systems for the reasons of their enhanced effect on correction of aberrations. When a high-refractive-index vitreous material is used as a cemented lens, however, the reflection of light off the cementing surface would also be not negligible. In such a case, it would be particularly effective to have an antireflection coating applied on the cementing surface.

Effective use of cementing surface coating is disclosed in JP(A) s 2-27301, 2001-324676 and 2005-92115 and U.S. Pat. No. 7,116,482, etc. In those publications, there is the particular mention of the cementing lens surface coating in the first lens group of the zoom lens having positive power at the foremost lens group. In the invention, too, the cementing lens surface in the first lens group of positive power may just as well be coated, as set forth there.

Depending on the refractive index of the lens involved and the refractive index of the adhesive material used, use may be made of coating materials of relatively high refractive indices such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive indices such as $MgF_2$, $SiO_2$, and $Al_2O_3$. These coating materials may then have a suitable thickness selected in such a way as to meet phase conditions. As a matter of course, the cementing surface coating may just as well be a multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc. On the base of a similar idea, cementing surface coating can effectively be applied to lens cementing surfaces other than those in the first lens group, too.

Figure 11:
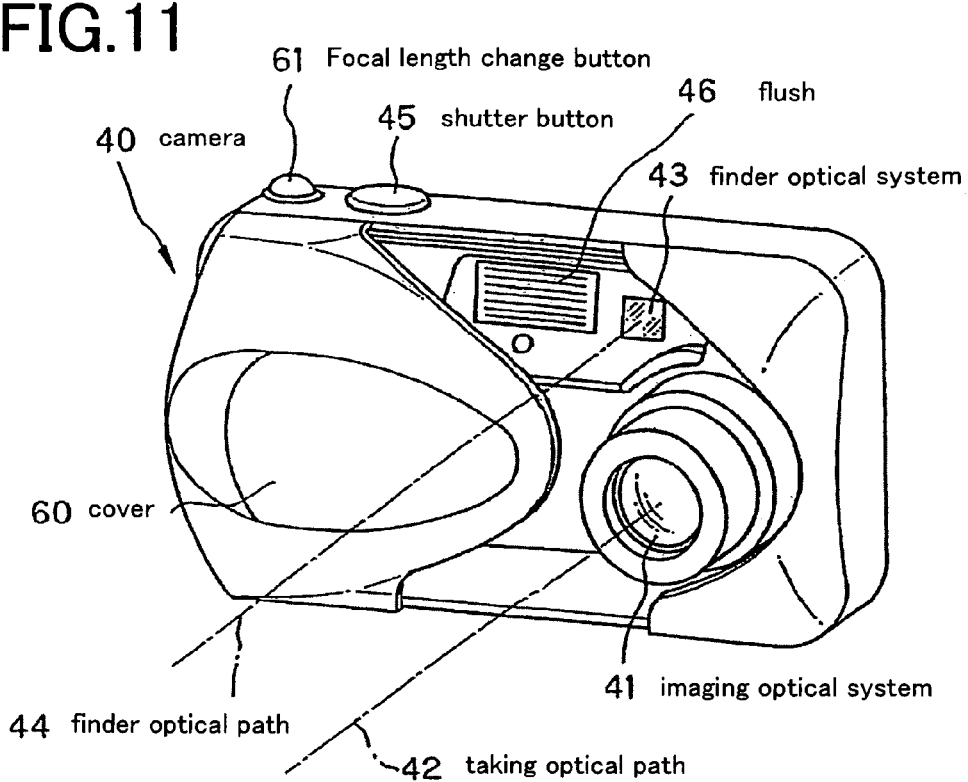
FIG. 11 is a front perspective view of the outside shape of a digital camera according to the invention.
Figure 12:
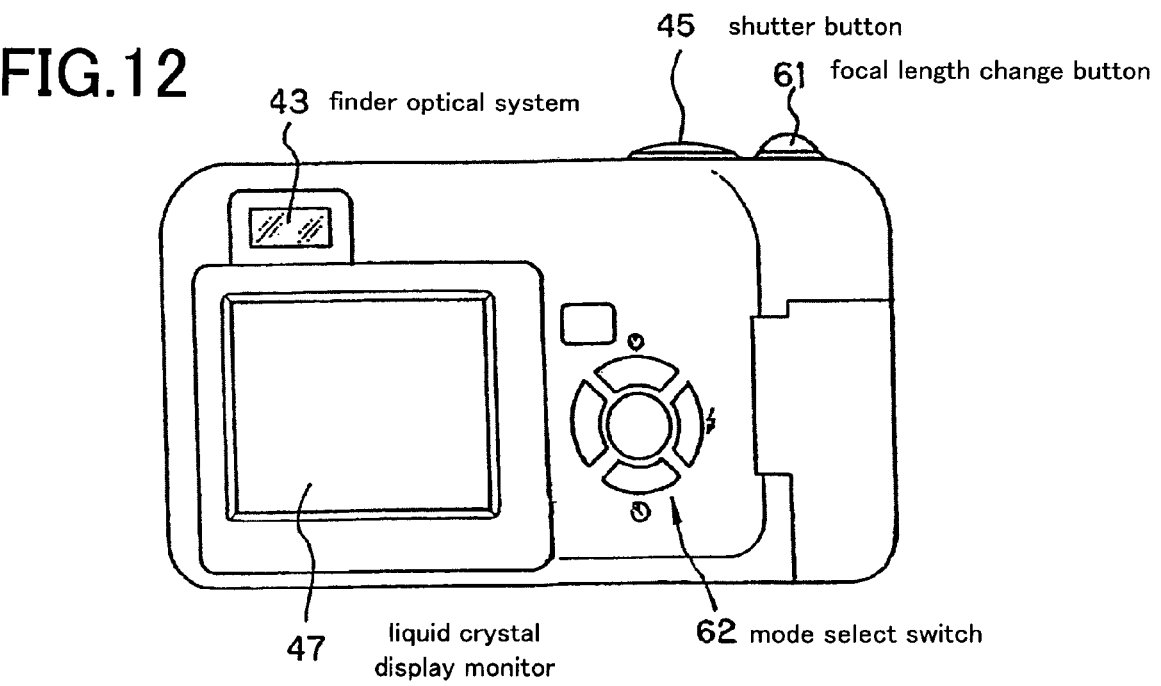
FIG. 12 is a rear perspective view of the digital camera of FIG. 11.
Figure 13:
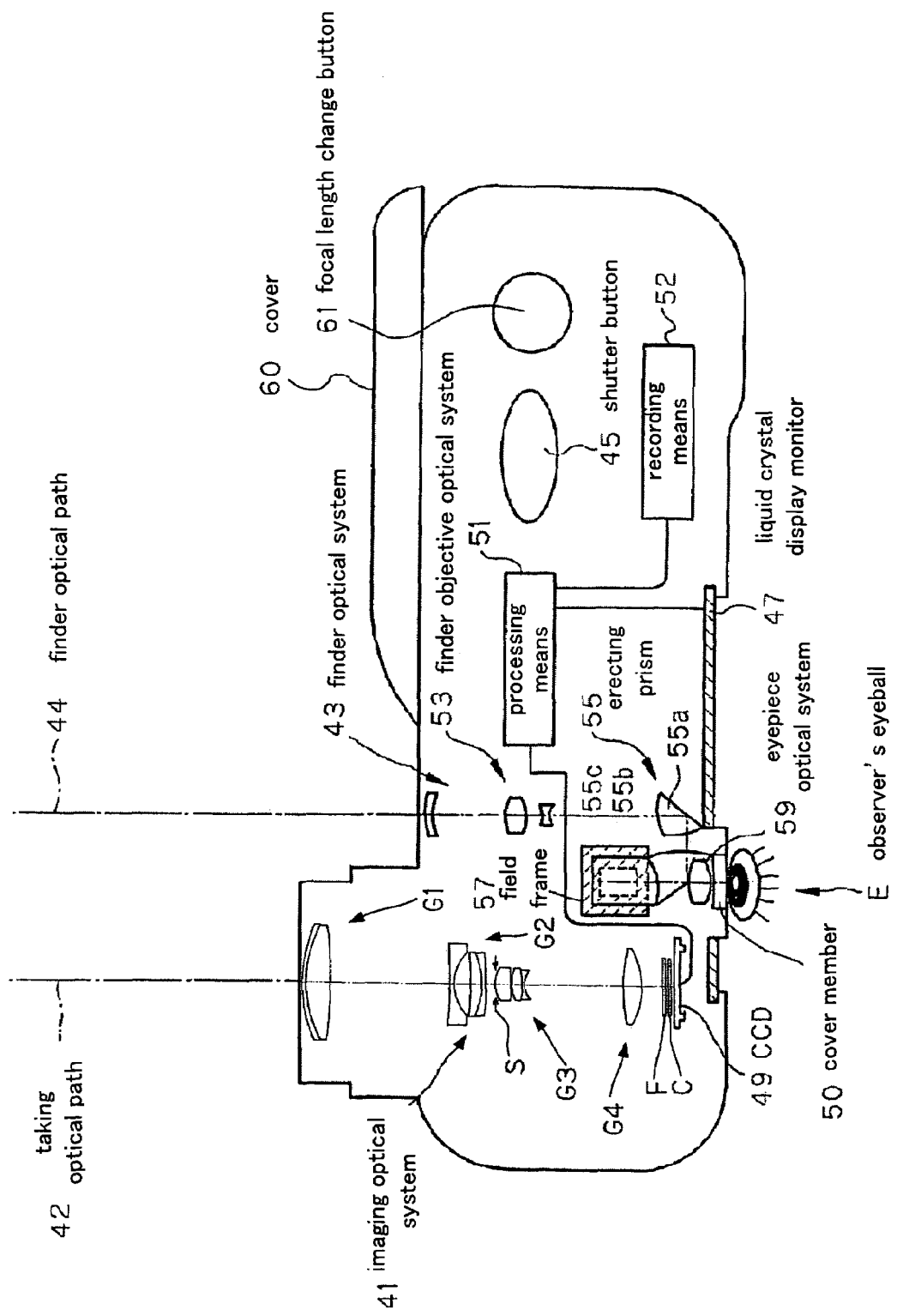
FIG. 13 is a sectional view of the digital camera of FIG. 11.

FIGS. 11, 12 and 13 are conceptual illustrations of a digital camera, in which such an inventive zoom lens as set forth above is incorporated in a taking optical system 41. FIG. 11 is a front perspective view of the appearance of a digital camera 40; FIG. 12 is a rear perspective view of the same; and FIG. 13 is a schematic sectional view of the setup of the digital camera 40. However, FIGS. 11 and 13 show the taking optical system 41 in operation. In the embodiment here, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a collapsible lens mount, a cover 60 is slid over the taking optical system 41, finder optical system 43 and flash 46. And, as the cover 60 is slid open to place the camera 40 in operation, the taking optical system 41 is let out, as in FIG. 11. As the shutter button 45 mounted on the upper portion of the camera 40 is pressed down, it causes an image to be taken through the taking optical system 41, for instance, the zoom lens of Example 1. An object image formed by the taking optical system 41 is formed on the imaging plane (photoelectric transformation plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be set up in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 11-13) and an erecting prism system 55 composed of erecting prisms 55a, 55b and 55c, and whose focal length varies in association with the zoom lens that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 14:
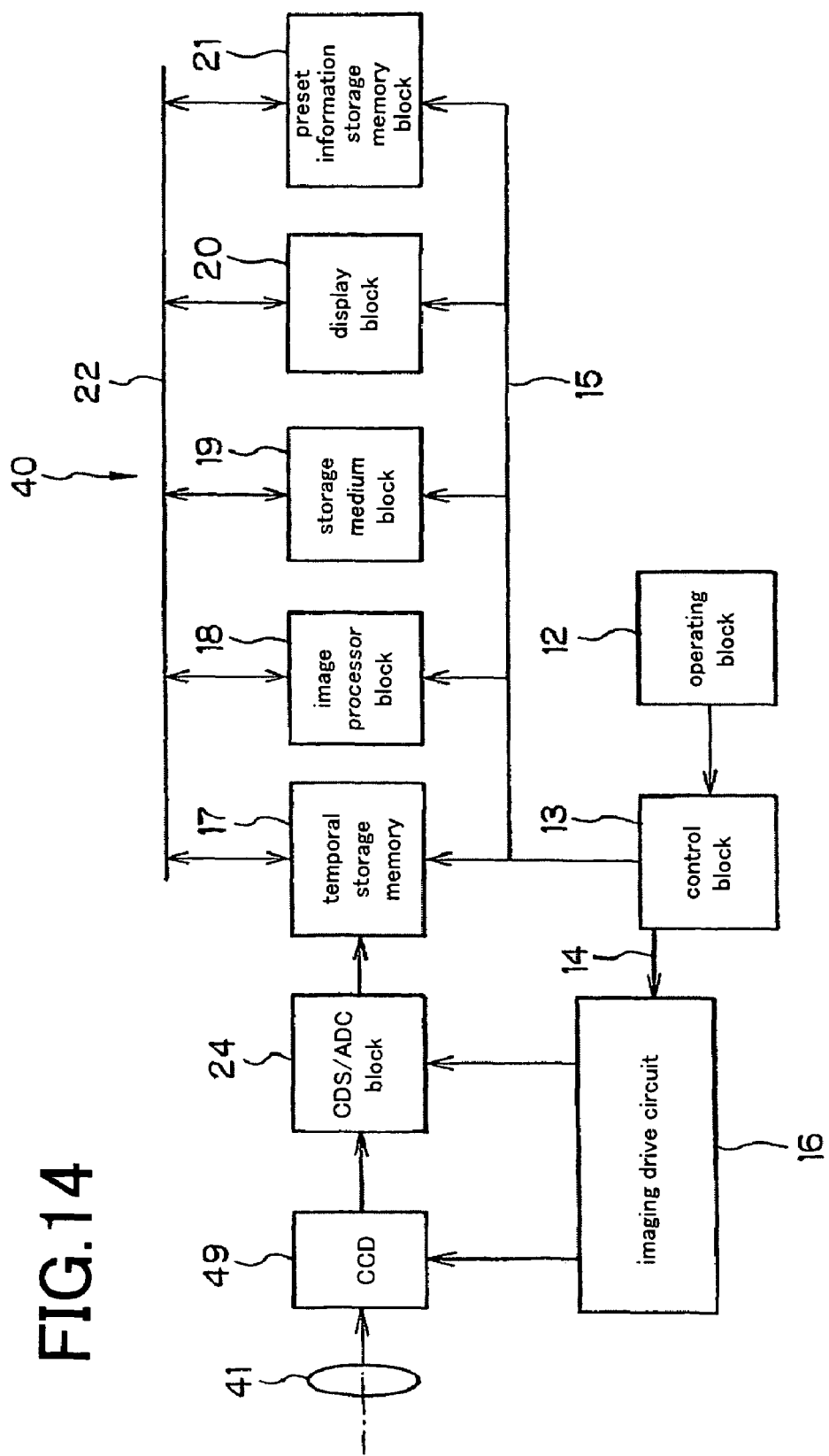
FIG. 14 is a block diagram illustrative of the construction of internal circuits in part of the digital camera of FIG. 11.

FIG. 14 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 14, the digital camera 40 is built up of an operating block 12, a control block 13 connected to the operating block 12 and an imaging drive circuit 16 connected to the control signal output port of the control block 13 via buses 14 and 15 as well as a temporal storage memory block 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 22, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capability and extremely stable imaging capability all over the zooming range, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

What is claimed is:

1. A zoom lens, comprising, in order from an object side thereof,
a front lens group having negative refracting power at a wide-angle end, and
a rear lens group having positive refracting power at the wide-angle end, wherein:
said front lens group comprises, in order from the object side, a first lens group of positive refracting power and a second lens group of negative refracting power, and
said rear lens group comprises, in order from the object side, a third lens group of positive refracting power and a fourth lens group of positive refracting power, and wherein:
said zoom lens comprises an aperture stop between a lens surface located in, and nearest to an image side of, the second lens group and a lens surface located in, and nearest to an image side of, the third lens group,
upon zooming from the wide-angle end to a telephoto end, a spacing between the first lens group and the second lens group grows wide,
a spacing between the second lens group and the third lens group becomes narrow, and
a spacing between the third lens group and the fourth lens group changes, and
positions of said respective lens groups and said aperture stop are adjusted such that an F-number grows greatest when the aperture stop is open in the course of zooming from the wide-angle end to the telephoto end.

2. The zoom lens according to claim 1, wherein a spacing between the first lens group and an image plane changes such that the spacing between the first lens group and the image plane grows wider at the telephoto end than at the wide-angle end, and said zoom lens satisfies the following conditions (1) and (2):

$$0.01 < [Fno(t)/Fno(w)]/(ft/fw) < 0.30 \quad (1)$$

$$1.013 < Fno(m)/Fno(t) < 1.2 \quad (2)$$

where Fno(w) is an F-number at the wide-angle end,
Fno(t) is an F-number at the telephoto end,
Fno(m) is an F-number at a position where the F-number grows greatest,
fw is a focal length of the whole zoom lens system at the wide-angle end, and
ft is a focal length of the whole zoom lens system at the telephoto end.

3. The zoom lens according to claim 1, wherein the first lens group comprises a negative lens and a positive lens, and a total number of lenses in the first lens group is 2.

4. The zoom lens according to claim 1,
wherein said aperture stop has a constant size all over a zooming range when it is open.

5. The zoom lens according to claim 1,
which further satisfies the following condition (3):

$$0.5 < Lt/ft < 1.4 \quad (3)$$

where Lt is a real distance on an optical axis of a surface located in, and nearest to the object side of, the first lens group to an image plane at the telephoto end, and
ft is a focal length of the whole zoom lens system at the telephoto end.

6. The zoom lens according to claim 1,
which is a four-group zoom lens.

7. The zoom lens according to claim 1,
wherein the fourth lens group satisfies the following condition (4):

$$0.5 < f1/f4 < 3.5 \quad (4)$$

where f1 is a focal length of the first lens group, and
f4 is a focal length of the fourth lens group.

8. The zoom lens according to claim 1,
wherein:
the second lens group moves such that in the course of zooming from the wide-angle end to the telephoto end, a spacing between it and the image plane grows widest,
the third lens group moves such that in the course of zooming from the wide-angle end to the telephoto end, a spacing between it and the image plane grows widest and the spacing between it and the image plane grows wider at the telephoto end than at the wide-angle end, and
said aperture stop moves such that in the course of zooming from the wide-angle end to the telephoto end, a spacing between it and the image plane grows widest and the spacing between it and the image plane grows wider at the telephoto end than at the wide-angle end, and
when a state where the spacing between the third lens group and the image plane grows widest is defined as an intermediate zooming state,
the first lens group is positioned more on the object side in said intermediate zooming state than at the wide-angle end, and
said aperture stop is positioned more on the object side in said intermediate zooming state than at the wide-angle end.

9. The zoom lens according to claim 1, which further satisfies the following condition (5):

$$1.2 < f3/|f2| < 2.5 \quad (5)$$

where f3 is a focal length of the third lens group, and
f2 is a focal length of the second lens group.

10. The zoom lens according to claim 8, wherein the first lens group moves with satisfaction of the following condition (6):

$$0.55 < (T1m-T1w)/(T1t-T1w) < 1.3 \quad (6)$$

where T1w is a real distance on an optical axis from a lens surface located in, and nearest to the object side of, the first lens group to the image plane, as measured at the wide-angle end,
T1m is a real distance on an optical axis from a lens surface located in, and nearest to the object side, of the first lens group to the image plane, as measured in the intermediate zooming state, and
T1t is a real distance on an optical axis from a lens surface located in, and nearest to the object side of, the first lens group to the image plane, as measured at the telephoto end.

11. The zoom lens according to claim 8,
wherein:
the second lens group moves such that a spacing between it and an image plane becomes narrower at the telephoto end than at the wide-angle end.

12. The zoom lens according to claim 8,
wherein:
upon zooming from the wide-angle end to the telephoto end, the second lens group moves first toward the object side.

13. The zoom lens according to claim 8,
which moves with satisfaction of the following condition (7):

$$1.0 < (T3m-T3w)/(T3t-T3w) < 1.5 \quad (7)$$

where T3w is a real distance on an optical axis from a lens surface located in, and nearest to the object side of, the third lens group to the image plane, as measured at the wide-angle end,
T3m is a real distance on an optical axis from a lens surface located in, and nearest to the object side, of the third lens group to the image plane, as measured in the intermediate zooming state, and
T3t is a real distance on an optical axis from a lens surface located in, and nearest to the object side of, the third lens group to the image plane, as measured at the telephoto end.

14. The zoom lens according to claim 8,
which further satisfies the following condition (8):

$$0.3 < fm/ft < 0.9 \quad (8)$$

where fm is a focal length of the whole zoom lens system in the intermediate zooming state, and
ft is a focal length of the whole zoom lens system at the telephoto end.

15. The zoom lens according to claim 8,
wherein:
the fourth lens group is positioned more on an image plane side at the telephoto end than at the wide-angle end.

16. The zoom lens according to claim 1,
wherein:
the second lens group comprises a double-concave negative lens located in, and nearest to the image side of, the second lens group, and
a positive lens located on an image side with respect to said double-concave negative lens.

17. The zoom lens according to claim 1,
wherein:
the third lens group comprises, in order from the object side, a single lens of positive refracting power and a cemented doublet lens of negative refracting power, wherein said cemented doublet lens comprises, in order from the object side, a positive lens and a negative lens.

18. An imaging apparatus, comprising a zoom lens and an imaging device located on an image side thereof and adapted to convert an image formed through said zoom lens into electric signals, wherein said zoom lens is recited in claim 1.

19. The imaging apparatus according to claim 18, which further comprises an image processing block adapted to correct said electric signals for aberrations contained in them.

* * * * *